(12) United States Patent
Kaplan

(10) Patent No.: US 12,045,572 B2
(45) Date of Patent: Jul. 23, 2024

(54) SYSTEM AND METHOD FOR HANDLING OUT OF SCOPE OR OUT OF DOMAIN USER INQUIRIES

(71) Applicant: MeetKai, Inc., Marina Del Rey, CA (US)

(72) Inventor: James Kaplan, Marina Del Rey, CA (US)

(73) Assignee: MeetKai, Inc., Marina Del Rey, CA (US)

( * ) Notice: Subject to any disclaimer, the term of this patent is extended or adjusted under 35 U.S.C. 154(b) by 453 days.

(21) Appl. No.: 17/353,339

(22) Filed: Jun. 21, 2021

(65) Prior Publication Data

US 2021/0312138 A1    Oct. 7, 2021

Related U.S. Application Data

(63) Continuation-in-part of application No. 17/197,959, filed on Mar. 10, 2021, now Pat. No. 11,869,497.

(Continued)

(51) Int. Cl.
*G06F 40/30*  (2020.01)
*G06F 9/451*  (2018.01)

(Continued)

(52) U.S. Cl.
CPC .............. *G06F 40/30* (2020.01); *G06F 9/453* (2018.02); *G06F 16/3329* (2019.01);

(Continued)

(58) Field of Classification Search
CPC .... G06F 9/453; G06F 16/3329; G06F 40/263; G06F 40/279; G06F 40/30; G10L 15/22
See application file for complete search history.

(56) References Cited

U.S. PATENT DOCUMENTS 7,831,564 B1   11/2010   Wei
8,700,608 B2   4/2014   Belknap
(Continued)

FOREIGN PATENT DOCUMENTS

CN         110728363         1/2020
KR     10-2002-0030545       4/2002
(Continued)

OTHER PUBLICATIONS

International Search Report issued Jul. 1, 2021 in corresponding PCT/US2021/021767.
(Continued)

*Primary Examiner* — Eric Yen
(74) *Attorney, Agent, or Firm* — Weide & Miller, Ltd.

(57) ABSTRACT

Disclosed is a system and method for processing out of scope or out of domain user inquiries with a first virtual assistant, which may include the steps of receiving a user request at a user device and converting the user request into a user inquiry, interpreting the user inquiry with an anomaly detection system to generate an interpretation of the user inquiry, forming a question from the interpretation using a textual composition module, accessing a dataset of text-based descriptions of a scope of the first virtual assistant using a textual composition module and a scope of an external source using a textual composition module, querying the dataset for an answer to the question, and when the answer is found in the description of the scope of an external source, transmitting the user inquiry to the external source for processing to generate a response to the user inquiry.

21 Claims, 18 Drawing Sheets

Related U.S. Application Data

(60) Provisional application No. 63/043,714, filed on Jun. 24, 2020, provisional application No. 62/987,814, filed on Mar. 10, 2020.

(51) Int. Cl.
  G06F 16/332 (2019.01)
  G06F 40/263 (2020.01)
  G06F 40/279 (2020.01)
  G10L 15/22 (2006.01)

(52) U.S. Cl.
  CPC .......... *G06F 40/263* (2020.01); *G06F 40/279* (2020.01); *G10L 15/22* (2013.01)

(56) References Cited

U.S. PATENT DOCUMENTS

| | | |
|---|---|---|
| 8,952,970 B2 | 2/2015 | Song |
| 8,981,962 B2 | 3/2015 | Fu |
| 9,267,518 B2 | 2/2016 | Chang |
| 9,607,102 B2 | 3/2017 | Lavallee et al. |
| 9,654,598 B1 | 5/2017 | Crawford et al. |
| 9,721,570 B1 | 8/2017 | Beal et al. |
| 10,156,775 B2 | 12/2018 | Zimmermann |
| 10,402,460 B1 | 9/2019 | Jesensky et al. |
| 10,402,589 B1 | 9/2019 | Madisetti et al. |
| 10,827,028 B1 | 11/2020 | Bromand |
| 11,042,369 B1 | 6/2021 | Kimball |
| 11,295,735 B1 | 4/2022 | Anuar |
| 2002/0032591 A1 | 3/2002 | Mahaffy |
| 2002/0080726 A1 | 6/2002 | Klassen |
| 2005/0124906 A1 | 6/2005 | Childre et al. |
| 2005/0278180 A1* | 12/2005 | O'Neill ............. G10L 15/22 704/E15.04 |
| 2007/0043736 A1 | 2/2007 | Jain |
| 2007/0064276 A1 | 3/2007 | Park |
| 2009/0106321 A1 | 4/2009 | Das |
| 2009/0132506 A1* | 5/2009 | Houck ............. G06F 16/90332 |
| 2010/0205222 A1 | 8/2010 | Gajdos |
| 2010/0217604 A1 | 8/2010 | Baldwin |
| 2011/0246496 A1 | 10/2011 | Chung |
| 2012/0060216 A1* | 3/2012 | Chaudhri ............. G06Q 10/10 726/21 |
| 2012/0317108 A1 | 12/2012 | Okazaki |
| 2013/0030804 A1 | 1/2013 | Zavaliagkos |
| 2013/0080177 A1 | 3/2013 | Chen |
| 2013/0304758 A1 | 11/2013 | Gruber |
| 2014/0167760 A1 | 6/2014 | Koh |
| 2014/0222436 A1 | 8/2014 | Binder |
| 2014/0244712 A1 | 8/2014 | Walters |
| 2014/0337032 A1 | 11/2014 | Aleksic |
| 2015/0051502 A1 | 2/2015 | Ross |
| 2015/0106737 A1 | 4/2015 | Montoy-Wilson et al. |
| 2015/0142704 A1* | 5/2015 | London ............. G06F 16/90332 706/11 |
| 2015/0199010 A1 | 7/2015 | Coleman et al. |
| 2015/0288857 A1 | 10/2015 | Fay et al. |
| 2015/0351655 A1 | 12/2015 | Coleman |
| 2016/0055240 A1* | 2/2016 | Tur ..................... G06F 40/284 707/706 |
| 2016/0166197 A1 | 6/2016 | Venkatraman |
| 2016/0205188 A1 | 7/2016 | Doraiswamy |
| 2017/0039045 A1 | 2/2017 | Abrahami |
| 2017/0039291 A1 | 2/2017 | Singh et al. |
| 2017/0046124 A1 | 2/2017 | Nostrant |
| 2017/0092270 A1 | 3/2017 | Newendorp et al. |
| 2017/0188976 A1 | 7/2017 | Kalra |
| 2017/0206797 A1 | 7/2017 | Solomon |
| 2017/0333666 A1 | 11/2017 | Goldberg et al. |
| 2017/0357637 A1 | 12/2017 | Nell et al. |
| 2017/0357910 A1 | 12/2017 | Sommer et al. |
| 2018/0011903 A1 | 1/2018 | Abolhassani et al. |
| 2018/0027126 A1 | 1/2018 | Stricker |
| 2018/0054228 A1 | 2/2018 | Lin |
| 2018/0075145 A1 | 3/2018 | Zhao et al. |
| 2018/0089410 A1 | 3/2018 | Caso |
| 2018/0096678 A1 | 4/2018 | Zhou et al. |
| 2018/0159889 A1 | 6/2018 | Sjouwerman |
| 2018/0181608 A1 | 6/2018 | Wu |
| 2018/0213037 A1 | 7/2018 | Roman |
| 2018/0232920 A1 | 8/2018 | Faulkner et al. |
| 2018/0262391 A1 | 9/2018 | Jung |
| 2018/0300679 A1 | 10/2018 | Mahmood |
| 2018/0315499 A1 | 11/2018 | Appelbaum |
| 2018/0330723 A1 | 11/2018 | Acero |
| 2018/0337875 A1 | 11/2018 | Friio |
| 2018/0374474 A1 | 12/2018 | Wang |
| 2019/0035396 A1 | 1/2019 | Adamski |
| 2019/0042955 A1 | 2/2019 | Cahill et al. |
| 2019/0083034 A1 | 3/2019 | Shim et al. |
| 2019/0122121 A1 | 4/2019 | Yu |
| 2019/0155566 A1 | 5/2019 | Dory |
| 2019/0205322 A1 | 7/2019 | Dobrynin |
| 2019/0215673 A1 | 7/2019 | Choi |
| 2019/0269376 A1 | 9/2019 | Butani |
| 2019/0354599 A1 | 11/2019 | Mital |
| 2019/0385606 A1 | 12/2019 | Won |
| 2020/0001040 A1 | 1/2020 | Gloria |
| 2020/0042286 A1 | 2/2020 | Bui |
| 2020/0092519 A1 | 3/2020 | Shin et al. |
| 2020/0242146 A1 | 7/2020 | Kalukin |
| 2020/0327431 A1 | 10/2020 | Woo |
| 2020/0335102 A1 | 10/2020 | Lefkofsky |
| 2020/0342968 A1 | 10/2020 | Avinash |
| 2020/0365139 A1* | 11/2020 | Kawano ............. G10L 15/063 |
| 2020/0402502 A1 | 12/2020 | Hanes |
| 2020/0410986 A1 | 12/2020 | Shen |
| 2021/0011887 A1 | 1/2021 | Visser |
| 2021/0049827 A1 | 2/2021 | Lebaredian |
| 2021/0056753 A1 | 2/2021 | Yasar |
| 2021/0073215 A1 | 3/2021 | Srinivasaraghavan |
| 2021/0165974 A1 | 6/2021 | Lee |
| 2021/0297494 A1 | 9/2021 | Kaplan |
| 2021/0304020 A1 | 9/2021 | Kaplan |
| 2021/0366473 A1 | 11/2021 | Maeng |
| 2022/0068261 A1 | 3/2022 | Sharifi |
| 2022/0157315 A1 | 5/2022 | Raux |
| 2022/0172714 A1 | 6/2022 | Kwatra |

FOREIGN PATENT DOCUMENTS

| | | |
|---|---|---|
| KR | 10-20100035391 | 8/2010 |
| KR | 10-2018-0050771 | 5/2018 |
| KR | 10-20160178837 | 5/2018 |
| KR | 10-2018-0096183 | 8/2018 |
| KR | 10-2019-0080834 | 7/2019 |
| KR | 1020190094307 | 8/2019 |
| KR | 20190106269 | 9/2019 |
| WO | WO 2019/172946 | 9/2019 |
| WO | WO 2019/183062 | 9/2019 |

OTHER PUBLICATIONS

International Search Report issued Jul. 9, 2021 in corresponding PCT/US2021/022827.

International Search Report issued Jul. 9, 2021 in corresponding PCT/US2021/024515.

International Search Report issued Jul. 19, 2021 in corresponding PCT/US2021/024720.

International Search Report issued Jul. 20, 2021 in corresponding PCT/US2021/024994.

International Search Report issued Aug. 9, 2021 in corresponding PCT/US2021/029472.

International Search Report issued Oct. 13, 2021 in corresponding PCT/US2021/038266.

International Search Report issued Jan. 20, 2022 in corresponding PCT/US2021/053646.

* cited by examiner

SYSTEM AND METHOD FOR HANDLING OUT OF SCOPE OR OUT OF DOMAIN USER INQUIRIES

1. CROSS-REFERENCE TO RELATED APPLICATION

This application claims priority to and incorporates by reference U.S. Provisional Application No. 63/043,714, filed on Jun. 24, 2020, U.S. Application No, and is a continuation in part of U.S. application Ser. No. 17/197,959, filed on Mar. 10, 2021.

2. FIELD OF THE INVENTION

The invention relates to virtual assistants and in particular to a method and system for processing or handling user inquiries which initially do not return a valid response.

3. BACKGROUND

FIG. 1 illustrates a prior art virtual assistant operation and its limitations due to operating on a linear and isolated task-based approach. A user input, commonly in the form of voice commands, initiates the process of operation. The voice input is recorded as audio 100, then converted to textual representation 105. The textual representation is delivered to the cloud assisted service to determine the user intent 110. Based on the determined user intent, an action is selected 115 and executed 120. Finally, the result of the executed action is presented to the user 125.

This type of process has several limitations. First, the process of FIG. 1 only considers one interpretation of the user's intent for execution. If this initial interpretation of the voice input from the user is incorrectly interpreted, such as due to poor pronunciation by the user, microphone positioning, background noise, or any other factor the interpretation may be incorrect, which will yield a sub-optimal result provided to the user. In addition, there may be multiple valid competing interpretations, but because of the single path nature of the prior art, only one interpretation is pursued. As a result, there is no room for additional context or different interpretations of the user's input.

Second, each task only considers the top textual representation. For example, only the top textual representation is selected 105 and passed on to the next task, where only the top user intent 110 is determined, and passed on to the next task. Then, only the top action 115 is selected, and so on. Thus, there is no room for collaboration between tasks.

Third, this process does not allow for back-tracing, and each task cannot be stored as an independent piece of the user's history. Thus, the process does not perform exclusionary commands such as "but not" functions well (as these commands require back-tracing) and does not leave room for multi-turn user interaction. For example, if the first audio 100 comprises a command to perform an internet search, and upon delivery of the results 125 the user wishes to modify the search using a second audio command, the user would have to manually incorporate the previous result 125 in their second audio command 100. A further drawback of the prior art arises because each task illustrated in FIG. 1 does not allow for collaboration between the tasks.

SUMMARY

To overcome the drawbacks of the prior art and provide additional benefits, a method for providing virtual assistance is disclosed. In one embodiment, this method comprises receiving a user input comprising a user request for action or information and then generating two or more primary interpretations for the user input by processing the user input. The two or more primary interpretations are unique possible transcriptions for the user input. This method also generates one or more secondary interpretations for one or more of the two or more primary interpretations by processing one or more of the primary interpretations to form alternative interpretations. This method also determines one or more primary actions responsive to the two or more primary interpretations and the one or more secondary interpretations, prepares one or more results from executing the one or more primary actions, and also determines whether the one or more secondary actions exist responsive to at least one of the one or more primary actions. If one or more secondary actions exist, then continuing to process the two or more of the primary interpretations, the one or more secondary interpretations, the one or more primary actions, and the one or more secondary actions to generate additional actions. Upon one or more additional actions not existing, designating the one or more results for which no additional actions are predicted as one or more terminal results, and scoring the one or more terminal results. This method designates the terminal result with the highest score as a top result and outputs at least the top result to the user or takes an action defined by the top result.

In one embodiment, the scoring is based on one or more of the following factors. A first scoring factor based on a conversational state. The conversational state comprises the one or more primary interpretations, the one or more secondary interpretations, the one or more actions, or the one or more results. A second scoring factor based on a user profile such that the user profile comprises user preferences and user history stored on the one or more servers. A third scoring factor is based on auxiliary metadata. The auxiliary metadata comprises data stored on the one or more servers not related to user preferences and not related to user history. The user input may be speech spoken by the user. It is contemplated that generating the two or more primary interpretations for the user input occurs concurrently in parallel. This method may further comprise requesting the user for clarification to which of the one or more primary interpretations or one or more secondary interpretations are correct. In one configuration the method is performed by an artificial intelligence layer operating on an operating system of a user device. The outputting at least the top result to the user or taking an action defined by the top result may comprise one or more of the following: playing a song, initiating a phone call, providing information to the user, playing a video, sending a text message, recording a video, transmitting information from a user device, and controlling a light.

Also disclosed herein is a virtual assistant system. In one embodiment, this virtual assistant comprises a user interface configured to receive input from a user and provide a response to the user, a processor configured to run machine executable code, and a memory storing non-transitory machine executable code. The machine executable code is configured to process the user input to generate two or more primary interpretations. The two or more primary interpretations comprise unique possible transcriptions for the user input. The machine executable code is further configured to generate one or more secondary interpretations based on one or more of the two or more primary interpretations by processing one or more of the primary interpretations to form alternative interpretations. The machine executable code also processes the primary interpretations and alternative interpretations to generate results which lead to two or more terminal states, to score the two or more terminal states to rank the two or more terminal states such that a top ranked terminal state is the top result. The top results are presented to the user or performed for the user.

In one embodiment, the user interface comprises a microphone and a speaker. In one embodiment, the user interface further comprises a transceiver configured to communicate over a network to a second device. The second device may be configured to execute second virtual assistant machine executable code to assist the virtual assistant system in generating the top result for the user. In one embodiment, the virtual assistant system may be a smartphone. In one embodiment, machine executable code is configured to present numerous terminal states to the user. The top results may be presented to the user or performed by one of the following actions: displaying text, displaying image, playing music, playing a video, performing a transaction, and turning a device on/off. In one embodiment, the machine executable code is further configured to present feedback to the user requesting additional information regarding one or more of the following: primary interpretations, alternative interpretations, result, and terminal states. The machine executable code is further configured to be responsive to receiving additional information from the user, processing the additional information to generate additional alternative interpretations or re-score the two or more terminal states.

A second method for providing virtual assistance is also disclosed. In one embodiment, this second method comprises receiving a user input comprising a request for action or information and generating two or more interpretations of the user input by processing the user input. The two or more interpretations are unique possible transcriptions for the user input. This method also comprises matching at least one of the two or more interpretations to one or more primary agents based on the one or more primary agents being configured to process the at least one interpretation. In this method, the one or more primary agents select one or more skills configured to process least one of the two or more interpretations. One or more results may be generated by processing with the one or more skills, the at least one of the two or more interpretations. This method further comprises determining whether one or more secondary agents may be matched to the one or more results for further processing of the results by one or more of the secondary agents. If one or more secondary agents are matched, this method continues to process the one or more results to generate additional results. At least one of the one or more results and at least one of the additional results are designated as two or more terminal results. These two or more terminal results are scored, and the terminal result with the highest score is designated as a top result. This method further comprises outputting at least the top result to the user or taking an action defined by the top result.

In one embodiment, an agent is a software module or routine executable to carry out parallel hypothetical reasoning. In one embodiment, a skill is a software module or routine executable to perform a task or generate a result in response to a single user query. In one embodiment, this method may further comprise generating one or more secondary interpretations for at least one of the primary interpretations. In one embodiment, this method may further comprise receiving user input comprises receiving speech from the user and converting the speech to a digital signal.

Also disclosed is a system for processing an out of scope or out of domain user request, which includes a user device with an input device configured to receive a user request, an output device configured to provide a response to a user, a memory, a processor, and non-transitory machine readable code stored in the memory and executed by the processor. A first virtual assistant may operate on the user device. The first virtual assistant may include a processing engine, one or more domains, an anomaly detection system, and a textual comprehension module. The processing engine may be configured to process the user request with the one or more domains. When the one or more domains cannot process the user inquiry, the processing engine may be configured to generate an interpretation of the user inquiry using the anomaly detection system and process the interpretation using the textual comprehension module.

In one embodiment, the anomaly detection system may also include an alternate language composition module, wherein the first virtual assistant may use a first language for processing, and the alternate language composition module may interpret the user inquiry using a second language which is different than the first language.

It is contemplated that the disclosed system may also include an external source which is accessible on a second user device or stored in a cloud, and the processing engine is further configured to process the interpretation using the textual comprehension module and the external source. The external source may, specifically, operate on a second virtual assistant having different capabilities than the first virtual assistant. The textual comprehension model may be further configured to generate a question from the interpretation, generate a text-based description of a scope of the first virtual assistant and a text-based description of a scope of the external source, and determine whether the question may be answered by the text-based descriptions of the scope of the first virtual assistant and the scope. The processing engine may be further configured to transmit the user inquiry to the external source for processing when the question is answered by the text-based description of the scope of the external source. In one embodiment, the textual comprehension model may also include a textual entailment module and a natural language inference module.

Also disclosed is a method for processing out of scope or out of domain user inquiries with a first virtual assistant, which may include the steps of receiving a user request at a user device and converting the user request into a user inquiry, interpreting the user inquiry with an anomaly detection system to generate an interpretation of the user inquiry, forming a question from the interpretation of the user inquiry using a textual composition module, accessing a dataset of text-based descriptions of a scope of the first virtual assistant using a textual composition module and a scope of an external source using a textual composition module, querying the dataset for an answer to the question, and when the answer is found in the description of the scope of an external source, electrically or wirelessly transmitting the user inquiry to the external source for processing by the external source to generate a response to the user inquiry.

In one embodiment of this method, the external source is a second virtual assistant having different capabilities than the first virtual assistant. It may also be the case that the first virtual assistant is operating on a first user device, while the external source is operating on a second device or stored in a cloud. The first virtual assistant may use a first language for processing, and the anomaly detection system comprises processing the user inquiry as if the user inquiry is in a second language different than the first.

It is contemplated that the step of forming a question may include using a textual entailment module. The method may also include an additional step of generating the dataset of text-based descriptions of the scope of the first virtual assistant and the scope of an external source using a textual composition module. The step of determining whether the question may be answered may also include using the textual entailment module. In another embodiment, the step of determining whether the question may be answered may include using a natural language inference module.

Also disclosed is a system for processing out of scope or out of domain user inquiries with a first virtual assistant, which includes a first user device comprising an input device configured to receive a user inquiry, an output device configured to provide a response to a user, a memory, a processor, and non-transitory machine readable code stored in the memory and executed by the processor. A first virtual assistant may operate on the user device. The virtual assistant may include an anomaly detection system and a textual comprehension module. The anomaly detection system may be configured to process the user inquiry to generate an interpretation of the user inquiry. The textual comprehension module may be configured to form a question from the interpretation of the user inquiry, access a dataset of text-based descriptions of a scope of the first virtual assistant and a scope of an external source, and query the dataset for an answer to the question. Once the answer is found in the text-based description of the scope of an external source, electrically or wirelessly transmitting the user inquiry to the external source for processing, thereby generating a response to the user inquiry.

In one embodiment, the external source may be a second virtual assistant operating on a second device which is different than the first user device or stored in a cloud. It is contemplated that the first user device may be a smartphone.

In one embodiment, the first virtual assistant may use a first language for processing, and the anomaly detection system may process the user inquiry as if the user inquiry is in a second language which is different than the first language. It is contemplated that the textual comprehension module may be configured to use textual entailment for one or more of the following: forming the question, querying the dataset, and finding the answer. The textual comprehension module may also be configured to use natural language inference for one or more of the following: forming the question, querying the dataset, and finding the answer.

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

The invention relates to a method for providing a digital concierge assistant that is capable of operating across multiple domains for an arbitrary number of turns in a conversation. Specifically, the invention related to a novel technique to allow for an arbitrary number of domain specific agents to operate in parallel with the ability for them to work together to accomplish goals. Further, this method provides the means with which contextual language can be understood from the state of the conversation across all agents. This method further allows for agents to be split across devices both in a local setting and with cloud server related connectivity.

Figure 2:
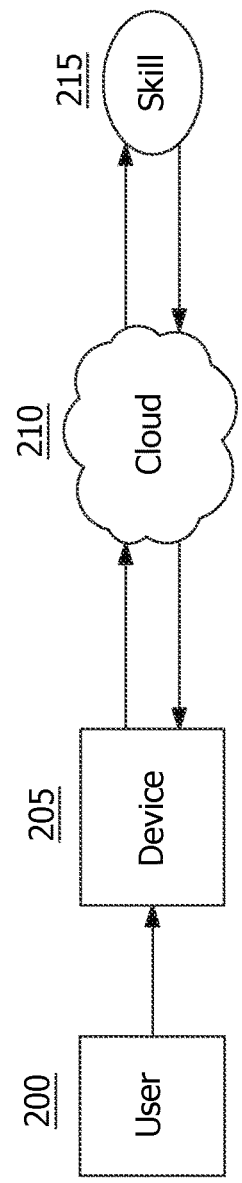
FIG. 2 illustrates an example environment of use of the virtual assistance described herein.

FIG. 2 illustrates an example environment of use of the virtual assistance described herein. The user 200 interacts with the device 205 via user input. User input prompts the device 205 to send a message to a cloud-based server 210, which then selects a skill 215 to fulfill the request. Skills are defined herein as a software module or routine executable to perform a task or generate a result, such as PlayMovie, PlayMusic, FindRecipe in response to a single user query. Other examples of skills may be software module or routine focused on a particular area, such as but not limited to wine information, recipe information, or cooking information. Skill selection refers to how a computerized virtual assistant selects what skill to be used given the input text. As illustrated in FIG. 2, the selected skill 215 then returns a message or response to the cloud 210, which in turn then passes the message back to the device 205. The device 205 can optionally inform the user 200 of some result of the skill 215.

The invention provides for a method of overcoming the shortcomings of the prior art, by providing for an unlimited number of turns between the user and the virtual assistant to be handled by the virtual assistant. In addition, there is the option for an unlimited number of domains. The example environment of operation is in a user device configured as the user interface for the virtual assistant. The user provides audio or text input into the device, for processing by the virtual assistant, to initiate the process. The user device may comprise any computing device including but not limited to a mobile computing device such as a smartphone, smartwatch, tablet, laptop, desktop computer, kiosk, or a network connected unit configured with a microphone, speaker, and optional display. Other devices may include a network connected television, appliance, vehicle, or any other device capable of or configured to function as described herein.

Figure 3:
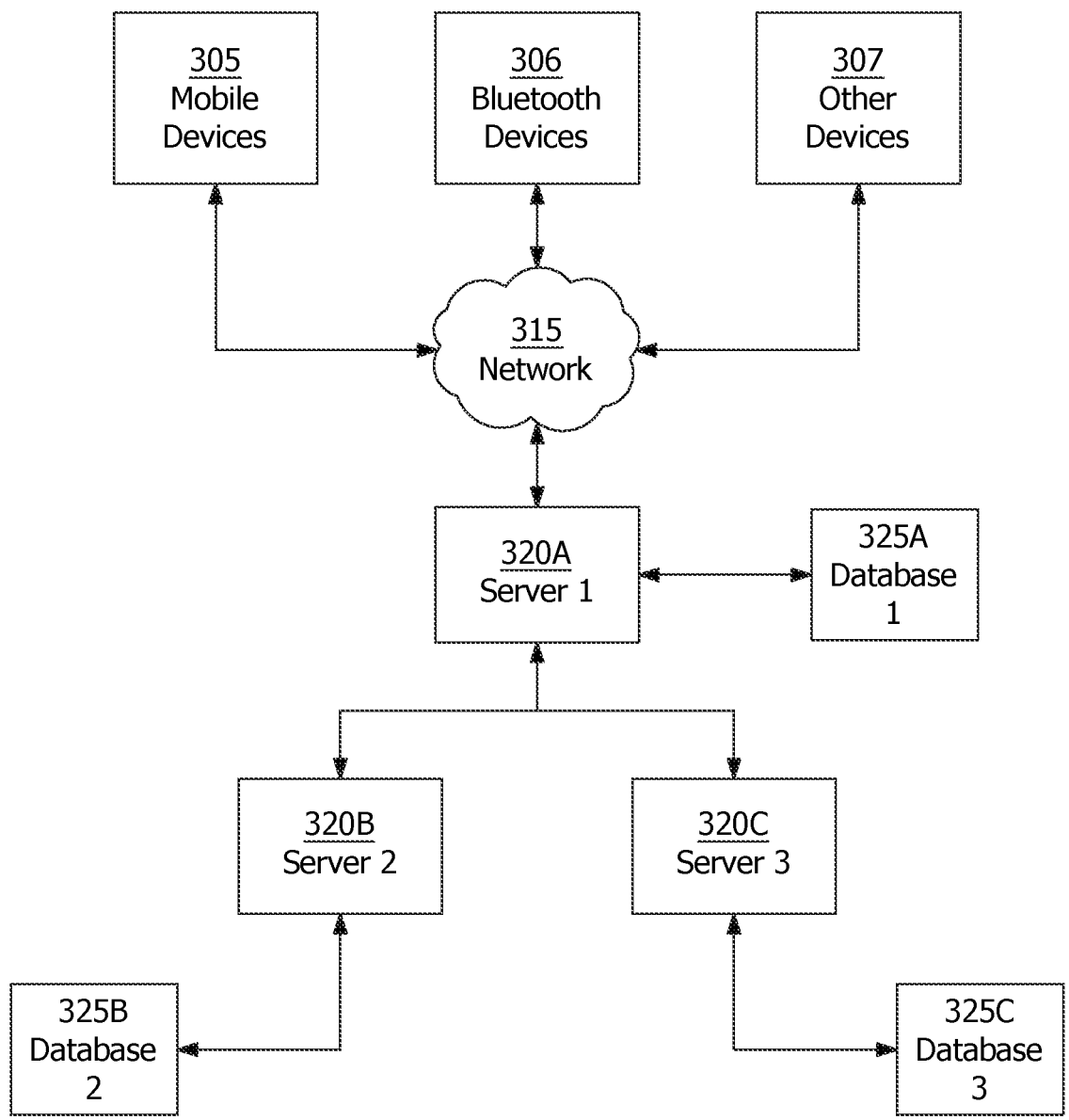
FIG. 3 illustrates an example environment of use of the virtual assistant system described herein.

FIG. 3 illustrates an example environment of use of the virtual assistant system described herein. This is but one possible environment of use and system. It is contemplated that, after reading the specification provided below in connection with the figures, one of ordinary skill in the art may arrive at different environments of use and configurations.

In this environment, user devices 305, 306, 307 are used to access the virtual assistant (including a user's account) are connected to remote servers 320A, 320B, 320C via a network 315. The user devices 305, 306, 307 may include (1) mobile devices 305 capable of capturing a voice, image, or other types of input, such as smartphones, smart watches, tablets; (2) Bluetooth devices 306 that the user may connect to remotely, such as speakers and consoles, and (3) any other devices 307 such as remote-controllable vehicle players, temperature controller, light switches, etc.

These user devices 305, 306, 307 are configured to connect to one or more networks 315, which in turn connect to one or more remote servers 320A, 320B, 320C. Such communication may occur over a local area network ("LAN"), a wide area network ("WAN"), a personal area network ("PAN"), the Internet, an ethernet, a Wi-Fi connection, or any other wired or wireless connections. The network 315 may comprise a single network or multiple networks in communication with each other. The network 315 connects to one or more servers 320A, 320B, 320C. The servers 320 may include any type of computing device capable of communicating with the user devices 305, 306, 307. The user devices 305, 306, 307 and servers 320 are configured with a processor and memory, and further configured to execute machine-readable code or machine instructions stored in the memory.

The servers 320 may also communicate with each other directly, or indirectly via one or more network or one or more servers. In the example illustrated in FIG. 3, the network 315 is directly connected to one server 320A. Server 320A is connected to its server database 325A and other servers 320B, 320C. These other servers 320B, 320C are also connected to their server databases 325B, 325C, respectively. Thus, all user devices 305, 306, 307 may communicate with all servers 320 and their respective databases 325.

The databases 325 can be stored on mobile device, secondary local device, or remote location as shown and may contain data such as a user account to identify the user to allow access to associated user data as well as information to be provided to the user. The data may be, for example, information relating to a user account to allow access to separate account information in another server. Other data may also be included such as GPS data, device identification information, databased, user training data, preferences, and the like.

In the embodiment illustrated in FIG. 3, the server 320A processes requests from the user devices 305, 306, 307. A second server 320B with an associated second database 325B, and third server 320C with an associated third database 325C may be provided to contain additional information that is not available on server 320A and database 325A. For example, one of the additional servers 320B or 320C may only be accessed based on the request from the user.

The configuration of FIG. 3 is but one possible embodiment and it is contemplated that other embodiments are possible.

Figure 4:
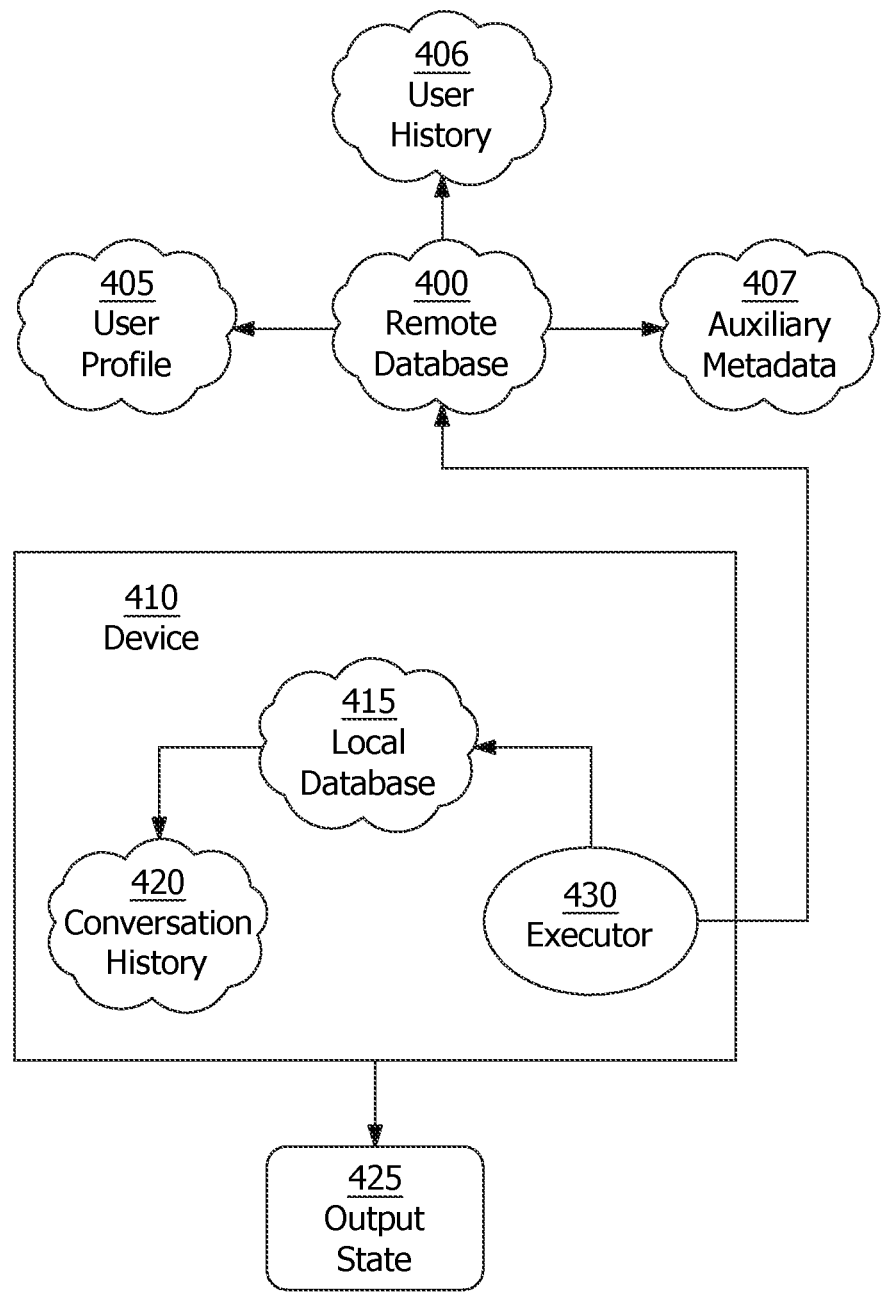
FIG. 4 illustrates an example embodiment of a user device and associated elements that enable the virtual assistant.

FIG. 4 illustrates and example embodiment of a user device and associated elements that enable the virtual assistant. The user device 410, as described above, includes an executor 430 comprising a software, hardware, or a combination of both configured to oversee and guide operation of the virtual assistant. In this embodiment, the executor 430 is located in the user device 410 but in other embodiments, the executor 430 may be located in a secondary user device or in a cloud computing environment (cloud) or remote server. In this embodiment, the executor 430 is stored inside the user device 410, along with a local database 415 and a memory or database storing a conversation history 420. The executor 430 receives and processes the user input as described herein. After receiving a request and performing processing, the executor 430 can either be configured to time out after a certain amount of time has elapsed after a request, or utilize a different heuristic based upon the running set of result states to determine that hypothetical reasoning should cease. Upon time out or determination that hypothetical reasoning should cease, the executor 430 collects all possible states and presents the results to the user. A scoring module may be is stored in a remote database.

Also shown in FIG. 4 is a remote database 400 that is in communication with the executor 430. The user request may also be sent to the remote database 400 for additional processing. The remote database 400 is also in communication with user provided data 405, user history data 406, and auxiliary meta data 407. The user provided data 405 comprises any information the user may have provided in registering a user account, such as name, date of birth, user-selected areas of interest, user-selected primary use for the device, user location, user metrics (such as heart rate, on devices that measure such metrics), etc. The user history data 406 comprises conversation history, recorded base states (discussed below), actions (discussed below), results (discussed below), etc. The auxiliary metadata 407 comprises non-user information generated by third parties, such as recent news, weather, etc. These additional data sources are used to score the results. For example, if the user profile indicates they are interested in 'race cars' and their user history indicate that auto racing is a primary topic on the weekends, then results associated with motorsports may be ranked higher than interpretations of the user request that indicate the question was about 'face scars'. The scoring module considers not only all confidences of actions taken as part of generating a state as part of the conversation history 420, but also the user provided data 405, the user history data 406, and any auxiliary metadata 407 to rank and/or discard the results and provide the results to the user as an output state 425.

In one embodiment, the improved virtual assistant may utilize a plurality of scorers. Such plurality of scorers may comprise or utilize scorers provided by third parties or based on auxiliary metadata provided by third parties. In one embodiment, the plurality of scorers may collaborate with each other to customize scoring based on user preferences and auxiliary metadata selected or accessed.

Figure 5A:
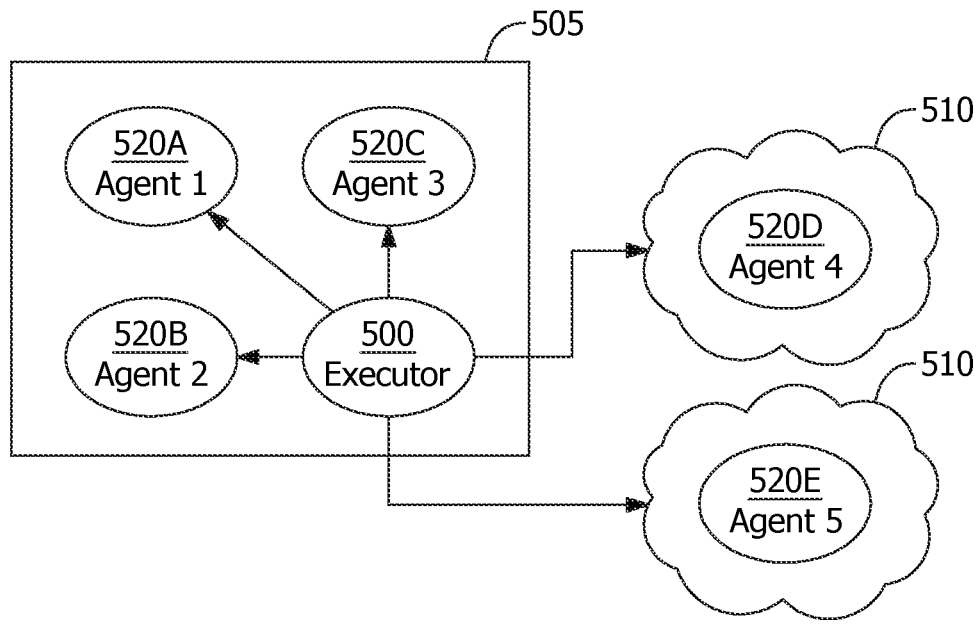
FIG. 5A and FIG. 5B illustrate two embodiments of the invention showing different locations of an executor module.
Figure 5B:
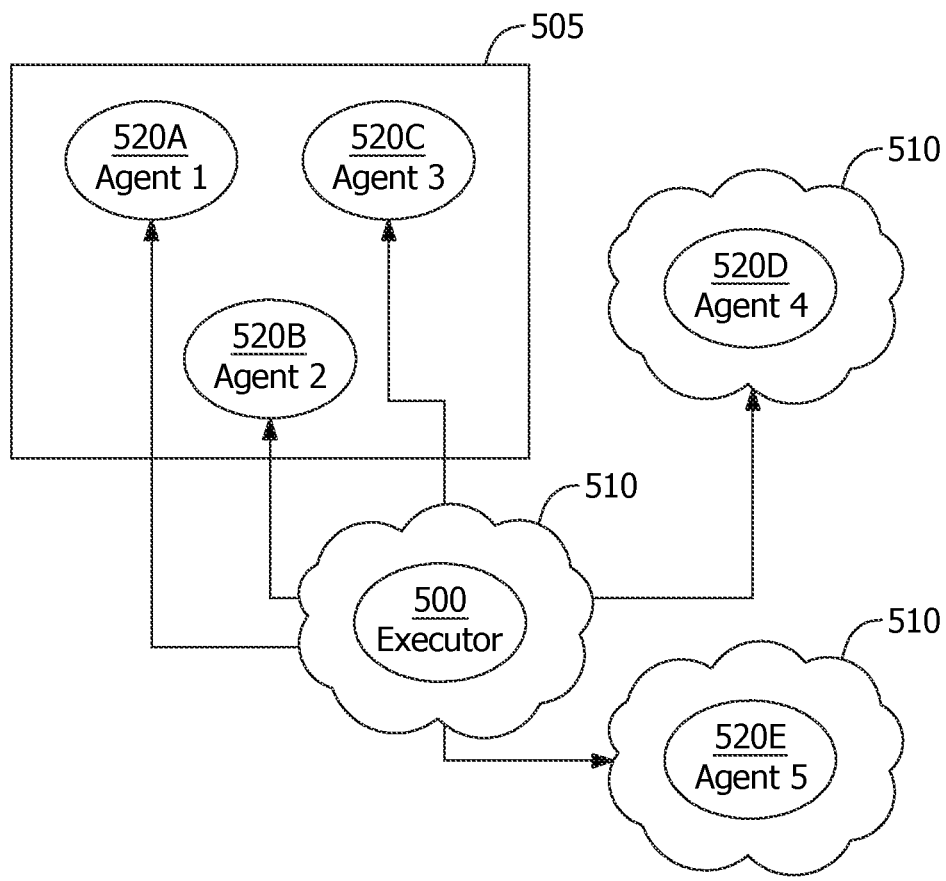

FIGS. 5A and 5B illustrate two embodiments of the invention showing different locations of an executor module. Both figures are discussed together due to the overlap in some elements. The executor 500 is comprised of a base node (software executing on hardware). FIG. 5A illustrates an embodiment where the base node of the executor 500 is mounted (located and operating) locally on the user device 505 that the user directly interacts with or which is local to the user, such as a smartphone which interfaces with a smartwatch or personal assistant device. FIG. 5B illustrates an embodiment where the base node of the executor 500 is mounted on a remote device 510. The remote device 510 can be either a device in the same network as the user device 505, a device in a separate datacenter, a remote cloud-based server, or a combination thereof.

The executor 500 can access any number of agents 520. The agents 520 are comprised of software executing on hardware. The executor 500 uses one or more agents 520 to carry out parallel hypothetical reasoning. The agents 520 can be amounted on the user device 505 (such as agents 520A, 520B, 520C) or on one or more remote devices 510 (such as agents 520D, 520E). As illustrated by FIGS. 5A and 5B, the location of the executor 500, the user device 505, the one or more remote devices 510, and the agents 520 are flexible. The user device 505 can access the executor 500 no matter where the executor 500 is mounted relative to the user device 505. Similarly, the executor 500 can access one or more agents 520 no matter where the agents 520 are mounted relative to the executor 500.

The method and apparatus disclosed herein also presents an improvement on skill selection and execution. As discussed above, conventional virtual assistants process a user request by performing tasks in a single path linear fashion. Each task may be carried out by a separate request from the device to the cloud to select, then execute, a skill. The selected skill for one task is not related to the selected skill for another task. In contrast, the method and apparatus disclosed herein allows selected skills to cooperate with each other by classifying user requests into specific vertical topics called domains, and by combining one or more skills into skill modules.

Figure 6:
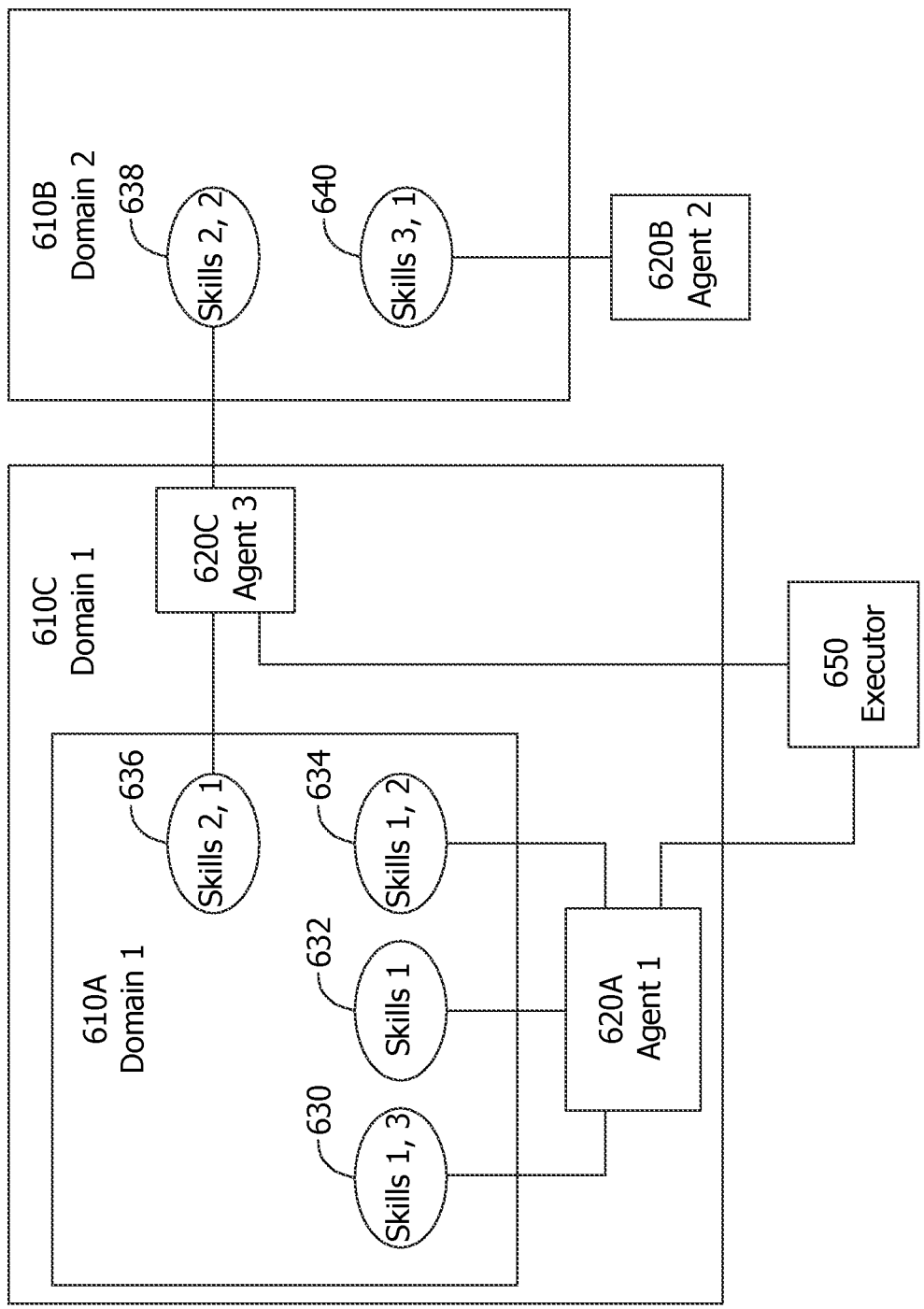
FIG. 6 illustrates a block diagram showing an interrelationship between the executor, agents, and skills, allowing for improved skill cooperation across domains.

FIG. 6 illustrates a block diagram showing an interrelationship between the executor, agents, and skills, allowing for improved skill cooperation across domains. FIG. 6 illustrates one possible layout or communication pathway of software modules. The number and arrangement of domains, agents, skill modules, and skills vary over time based on the user's preference, the user's profile, and current and past user interaction. In this example embodiment, an executor 650 is configured as the primary control module and is configured to communicate with one or more other software modules. As shown, the executor 650 is configured to communicate directly with three agents 620, each agent supporting its own domain 610. Each agent 620, in turn, communicates with skill modules 630-640 within their respective domains 610. As discussed in more detail below, each skill module 630-640 comprises one or more skills related to a domain 610.

Within domain 3 610C is domain 1 610A, agent 1 620A, and agent 3 620C. Domain 1 610A includes numerous skill modules, such as skill modules 630, 632, 634, 636. These skill modules 630, 632, 634, 636 are accessible by the agent 620A to carry out the request from the user. As shown, skill module 636 within domain 1 610A is configured to also communicate with agent 3 620C to carry out the request, such as if during processing skill module 636 determines that it must seek data from agent 3 620C.

The system of FIG. 6 is also configured such that agent 3 620C, which is part of domain 3 610C may communicate with domain 2 610B. Within domain 610B are skill module 638 and skill module 640. Thus, the agent 3 620C in domain 3 610C may access and communicate with skill module 638 to perform request processing.

Different user requests will result in different agents being activated, and in turn, different skill modules being called to obtain the information or action requested by the user. As discussed above, multiple paths may be developed simultaneously to respond to a user's request. Applying this principle to FIG. 6, the executor 650 may receive a request from a user in the form of a voice command, and the executor 650 then enable agents 620 on possible interpretations of the user's request. In turn, each agent 620 enables skill modules 630-640 to further obtain, develop, and provide optional responses for the user. A scoring module evaluates which response to provide to the user, such that input from each agent may be a different response. A path that looks promising initially may, after developed with one skill module, be an undesirable response. A path that initially appeared to be sub-optimal may, after development with another skill module, yield the best scored path. During and after the response being provided to the user, each branch (agent path and sub-paths) is maintained, thus allowing the user to modify or clarify the request, thus allowing rapid and dynamic shift to a different branch (agent path), or for a path to be further developed.

Each domain may encompass smaller domains. In FIG. 6, domain 1 610A is inside domain 3 610C. For example, an entertainment domain may encompass smaller domains such as a movie domain, a television domain, and a music domain. On the other hand, domain 2 610B is separate from domain 1 610A and domain 3 610C.

As shown and during operation, each domain may utilize one or more agents to process requests associated with that domain. Agents are software modules or routine that may rely on multiple skill modules to process a single request, particularly if the request from the user involves more than one skill. In FIG. 6, agent 1 620A supports domain 1 610A, agent 2 620B supports domain 2 610B, and agent 3 620C supports domain 3 610C. It is contemplated that more than one agent may support a domain (not illustrated in FIG. 6).

As part of operation, the executor 650 controls or directs requests to the agents 620 and is therefore able to process user requests in the domains 610 using these agents 620 to support the request. In some instances, the executor 650 may only utilize one agent 620 to process a user request in a single domain. In other instances, the executor 650 may utilize multiple agents across multiple domains to process a user request. For example, a user request to find "food recipes with wine pairings" may prompt the executor 650 to call upon agents from the "recipes" domain, the "wine" domain, and the "cooking" domain to run simultaneously using independent but parallel processing paths as related agents 620 for a particular request.

In the example embodiment of FIG. 6, during operation each agent may be configured to have access to at least one skill module. For example, agent 1 620A has access to several skill modules 630, 632, 634, 636. Agent 2 620B has access to skill module 640. Agent 3 620C has access to skill modules 636, 638. It is contemplated that agents may access the same skill modules or have dedicated skill modules. As illustrated in FIG. 6, agent 1 620A and agent 3 620C can both access skill module 636.

During operation, the skill modules 630-640 may access one or more skills. Some skill modules may be configured to access overlapping skills (for example skill modules 630, 634 can both access skill 1). Other skill modules may be configured to access the same skills in different orders (for example skill modules 634 may be configured to access skill 1 before skill 2, while skill module 636 may be configured to access skill 2 before skill 1). Yet other skill module may be configured to utilize multiple iterations of the same skill (for example skill 638 may be configured to utilize skill 2 twice). It is further disclosed that some skill modules may be configured to optionally and selectively access one or more skills. For example, even though skill module 630 can access skill module 1 and skill module 3, it may only utilize skill 1 for a particular request based on the interpretation of the request.

Although shown in FIG. 6 in one particular arrangement, the location or accessibility of agents 620 relative to the skill modules is flexible. One or more skill modules may be mounted inside a user device ("local skill modules"), while other skill modules may be mounted inside remote devices or housed in remote cloud-based servers ("remote skill modules"). Similarly, one or more agents may be mounted inside a user device ("local agents"), while other agents may be mounted inside remote devices or housed in remote cloud-based servers ("remote agents"). It is contemplated that local agents may access local skill modules and remote skill modules as needed. Similarly, remote agents may access local skill modules and remote skill modules as needed.

By allowing the skill modules to share skills, agents to share skill modules, and the executor to use one or more agents simultaneously, this invention permits skill cooperation, which was not possible in conventional virtual assistants. Further, conventional virtual assistants fetch each individual skill from a cloud and executes said skill in a linear, single path fashion. This invention, in contrast, allows one or more agents to access skill modules both locally and remotely, and to execute these skill modules (to satisfy the request) in parallel, adding both speed and depth to the virtual assistant's capabilities.

Figure 1:
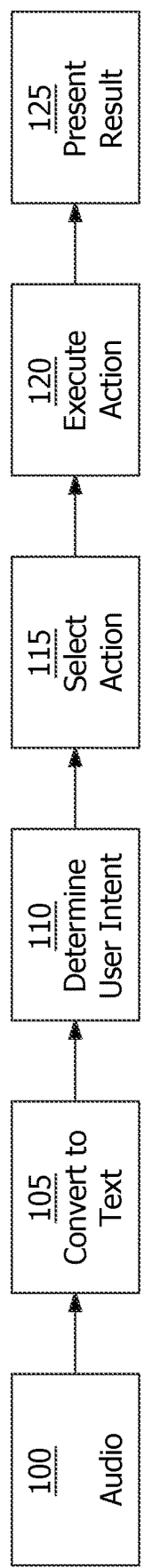
FIG. 1 illustrates a prior art virtual assistant operation and its limitations due to operating on a linear and isolated task-based approach.
Figure 7:
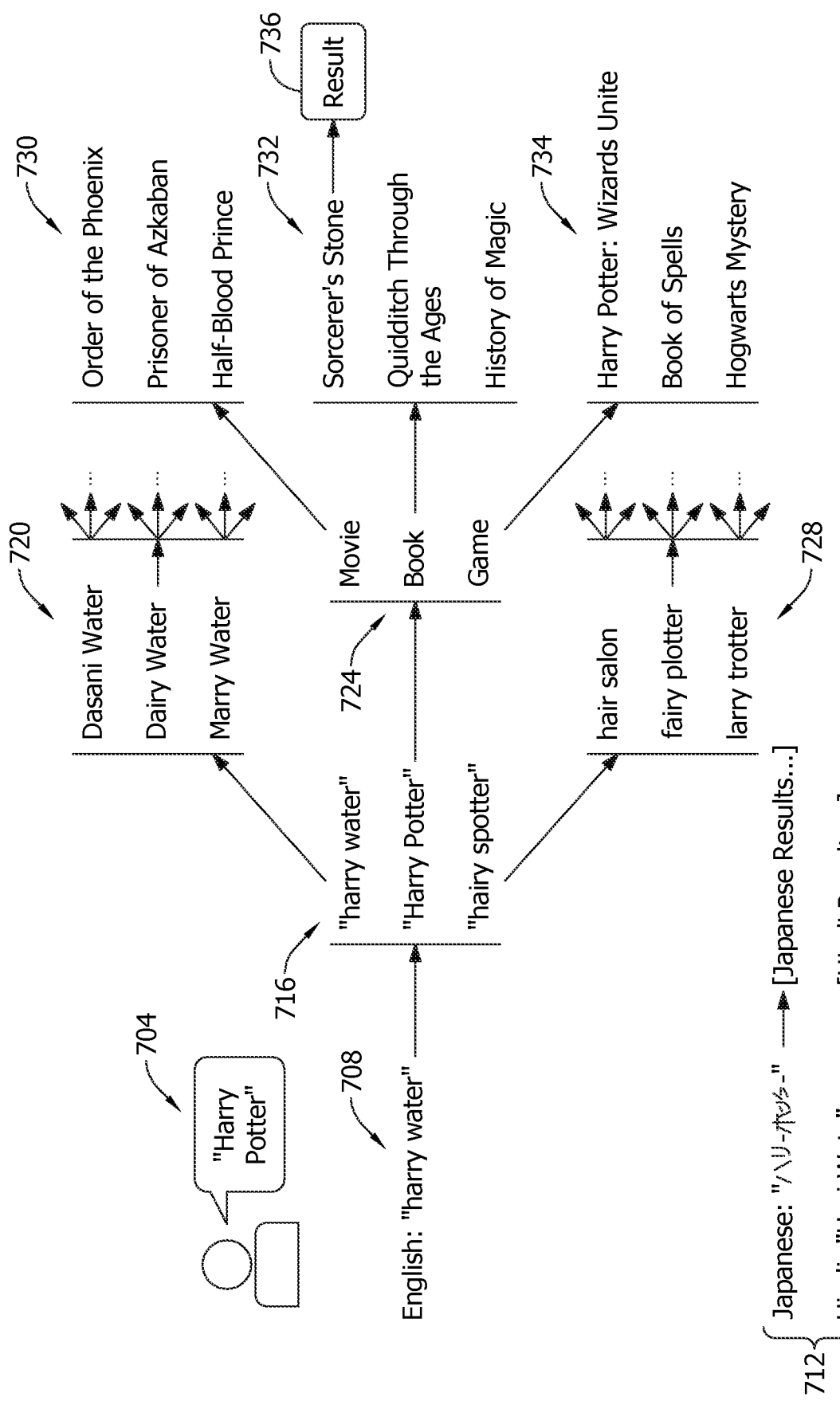
FIG. 7 illustrates a practical application of the improved virtual assistant using a sample user input phrase

FIG. 7 illustrates a practical application of the improved virtual assistant using a sample user input phrase "Harry Potter". As described, the virtual assistant enables a multiple path, parallel processing approach to increase accuracy and improve the user experience. Instead of a single processing path as shown in FIG. 1, the disclosed method executes multiple parallel simultaneous processing paths, including multiple interpretations.

As shown in FIG. 7, a user may enter an input, such as a voice command (or any other input method) comprising a phrase 704. The executor converts the audio to a data representation 708, such as by using speech recognition technology to create digital data representing the user's audio. Speech recognition and audio to digital conversion is well known and as such it is not described in detail herein. The executor converts the data representation 708 into additional textual interpretations 716, including textual representations across all supported languages 712. As can be seen with the exemplary textual interpretations 716, although the user may speak the words "Harry Potter", the digital data 708 after speech recognition may not be correct and may actually be interpreted as "harry water". As we know, the user is seeking information about "Harry Potter" and not "harry water". In prior art systems, the user would be provided incorrect information based on the incorrect but top interpretation, or no information at all since "harry water" is non-sensical.

The disclosed method and apparatus overcome the drawbacks of the prior art and provides an improved method to generate a better or optimal response to the user, even when the initial interpretation of the spoken request is inaccurate. To overcome the drawbacks of the prior art, the additional textual representation 712, 716 are further converted into possible actions or interpretations 720, 724, 728. These possible actions or interpretations, in turn, may yield one or more possible results 730, 732, 734. All results will be evaluated by the scoring module, and one top result 736 will be selected for output. As discussed herein in greater detail, numerous factors are considered when ranking the possible results 730, 732, 734 such as but not limited to user's interaction history, web browsing history, user account information, and personal habits.

As discussed above, conventional virtual assistants use a single textual representation of the user's input. In contrast, the improved virtual assistant uses a branching transcription method to consider all possible written interpretations. Thus, while the textual representation 708 may be the initial interpretation of the user input, the executor will also consider other textual representations 716 or interpretations across all supported languages 712. This is accomplished by allowing for transcription of the spoken input to be carried out by some languages on the device and other languages in the cloud. For example, the end user device might support language A and B, but the cloud service could support C-Z, upon a user's spoken input being received, the device would transcribe into language A and B and then combine that with the cloud services transcription capabilities for C-Z. All these inputs are then simultaneously considered as possible interpretations of what the user may have said. In one embodiment, the three top choices are selected.

Each textual representation 712 and 716 triggers the executor to select possible actions. In one embodiment, the three top actions are selected. For example, the textual representation 716 of "harry water" may trigger the top action of generating a list of possible types of drinking water 720. As another example, the textual representation 716 "Harry Potter" may trigger the top action of generating related media, such as movies 732, books 730, and games 734. As yet another example, the textual representation 516 "hairy spotter" may trigger the top action of compiling a list of hair salons, or possible actions for searching phonetically similar phrases 728. Other actions can also be triggered but are not shown in FIG. 7.

Each result may trigger additional actions and yield additional results. For example, the movie category of result group 724 may trigger the top action of generating a list of related movie titles. The invention may select the three top movie titles 730. As another example, the book result 724 may trigger the top action of generating a list of related book titles. The invention may select the three top book titles 732. As another example, the game result 724 may trigger the top action of generating a list of related game titles. The invention may select the three top game titles 734.

Results 730-734 also represent terminal results, which are results that do not warrant further branching. In contrast, results 716, 720, 724, 728 are non-terminal results, which require further branching. Each terminal result (such as "Order of the Phoenix" under 730, "Quidditch Through the Ages" under 732, and "Hogwarts Mystery" under 734) will receive its in own result score. The result with the highest score 736 will be selected and presented to the user.

Another novel aspect of an embodiment of this innovation as compared to the prior art is the nature in which a conversation can be carried out over multiple turns. Instead of only considering the next turn as following the current conversational state as in a conventional system, all previous prior states, from the parallel exploration, are considered as possible origins for stepping the conversation forward. For example, upon receiving the top result, which in the example illustrated in FIG. 7 is the book title "Sorcerer's Stone" 732, the user may enter a new voice command such as "I want movies" (not illustrated in FIG. 7). The executor would then backtrack to step 724 and append higher scores to results related to the movie action to present the result with the new highest score, which in this example may be the movie title "Order of the Phoenix" under 730 (not illustrated in FIG. 7). Alternatively, the executor may abandon paths which are not related to movies, and further develop the movie paths.

Yet another novel aspect of the method and apparatus disclosed herein is the use of additional data to adjust scoring. For example, based on the user input phrase 704 of "Harry Potter", book titles 730, movie titles 732, and game titles 734 may receive equal scores. However, data from the user history may suggest the user frequently plays or asks about video games. As a result, game titles 734 may receive a higher score than book titles 730 and movie titles 732. Auxiliary metadata may further suggest a new video game featuring Harry Potter has just been released, titled "Hogwarts Mystery". As a result, "Hogwarts Mystery" under 734 may receive the top score (not illustrated in FIG. 7) instead of a game that was released 5 years ago.

Figure 8:
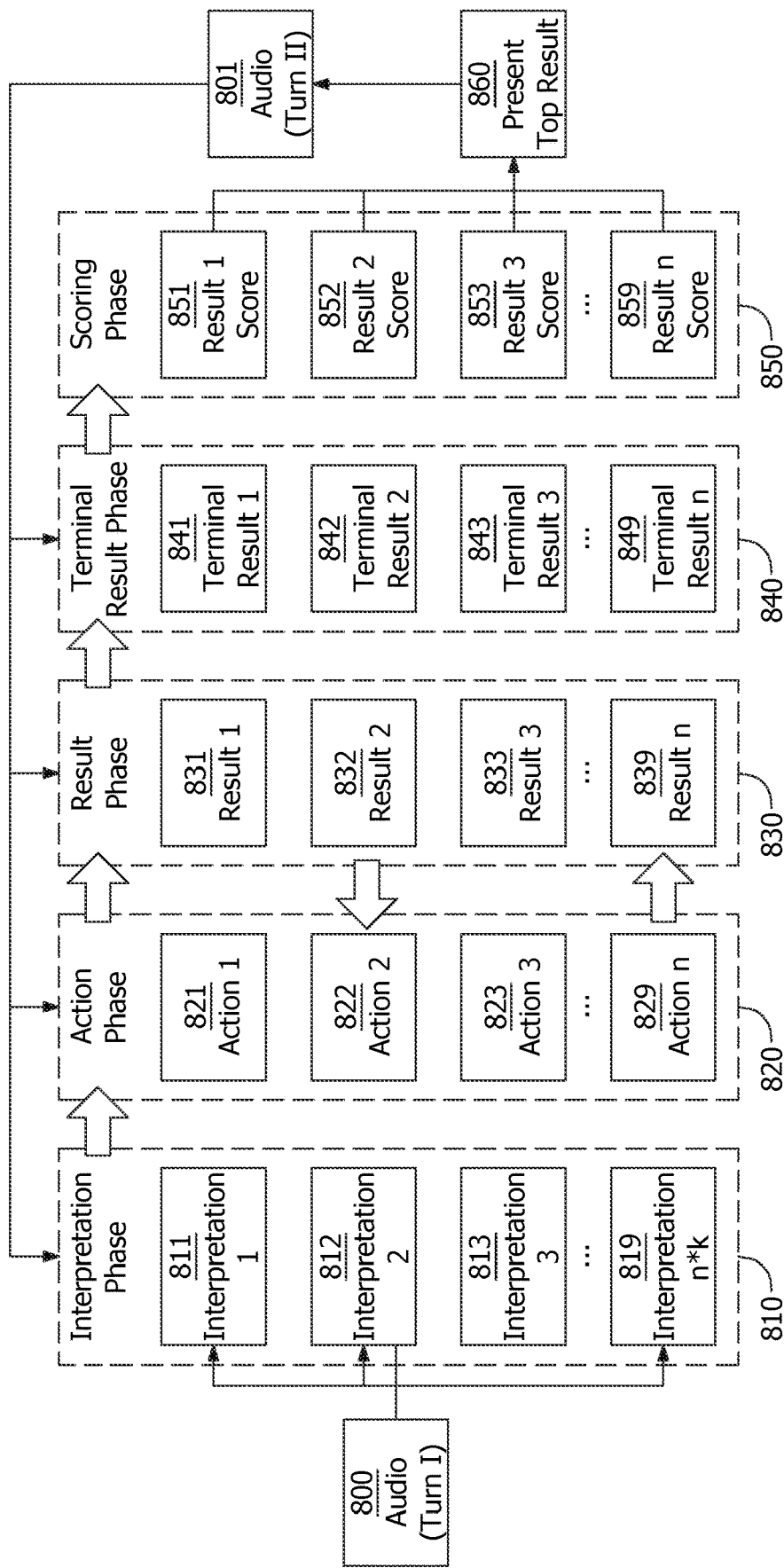
FIG. 8 illustrates an overview of the branching transcription method discussed in FIG. 7.

FIG. 8 illustrates a broad overview of the branching transcription method discussed in FIG. 7. Upon user input (commonly in the form of a voice command, but may be in any digital format) 800, the executor enters an interpretation phase 810, where the user input is interpreted into textual representation. Next, the executor enters an action phase 820, where all possible actions are considered for each textual interpretation. Next, the executor enters the result phase 830, where the result of each action is prepared.

Some results may require further actions. For such results, the executor may enter additional action phases 820, yielding additional result phases 830. The executor repeats the action phase 820 and result phase 830 until results do not require further actions. For those results, the executor enters the terminal result phase 840, where the results are designated as terminal and sent to the scoring module discussed above. Note, the executor may process action phases 820, result phases 830, and terminal result phases 840 in parallel.

In the scoring phase 850 the scoring module appends a score to each terminal result and selects the result with the highest score. The executor actualizes the result with the highest score, meaning the action associated with that result is executed, and the result is presented to the user 860 as the top result (of many) or the only result or action. In one embodiment, a top number (such as 3) of results are actualized (not illustrated in FIG. 8). If the user provides additional user input 801, the executor may backtrack to any of the previous phases 810-850 as necessary to process said additional user input 801.

In the interpretation phase, the executor sends the user input to one or more local and/or remote agents to generate textual representations. FIG. 8 illustrates 1 to N*k interpretations 811-819. These interpretations 811-819 are generated in parallel. In one embodiment, a top number (such as 3) of interpretations is selected for processing in the action phase 820.

In the action phase, each of the 1 to N*k interpretations 811-819 is processed into 1 to n actions 821-829. In other words, the executor may predict a set of 1 to n actions 821-829 for interpretation 1 811, a set of 1 to n actions 821-829 for interpretation 2 812, and so on. Note the executor is capable of predicting all actions 821-829 are parallel. In one embodiment, a top number (such as 3) of actions for each interpretation is selected for processing in the result phase 830.

In the result phase, a result is prepared for each action. For example, result 1 831 is prepared for action 1 821, result 2 832 is prepared for action 2 822, and so on. For example, if action 1 821 is playing a video, result 1 831 is queueing the video file for output. Note the executor can prepare all results 831-839 in parallel and generally simultaneously or concurrently.

Some results may require further actions. For example, if action 2 822 is find all media related to "Harry Potter", then result 2 832 may comprise identification of different types of media (movies, books, games, etc.). The executor would then execute additional actions, such as an action to query all movies related to "Harry Potter", yielding results comprising a list of movie titles. Note, the executor is capable of predicting further actions for some results, while simultaneously designating other results as terminal results.

Figure 9:
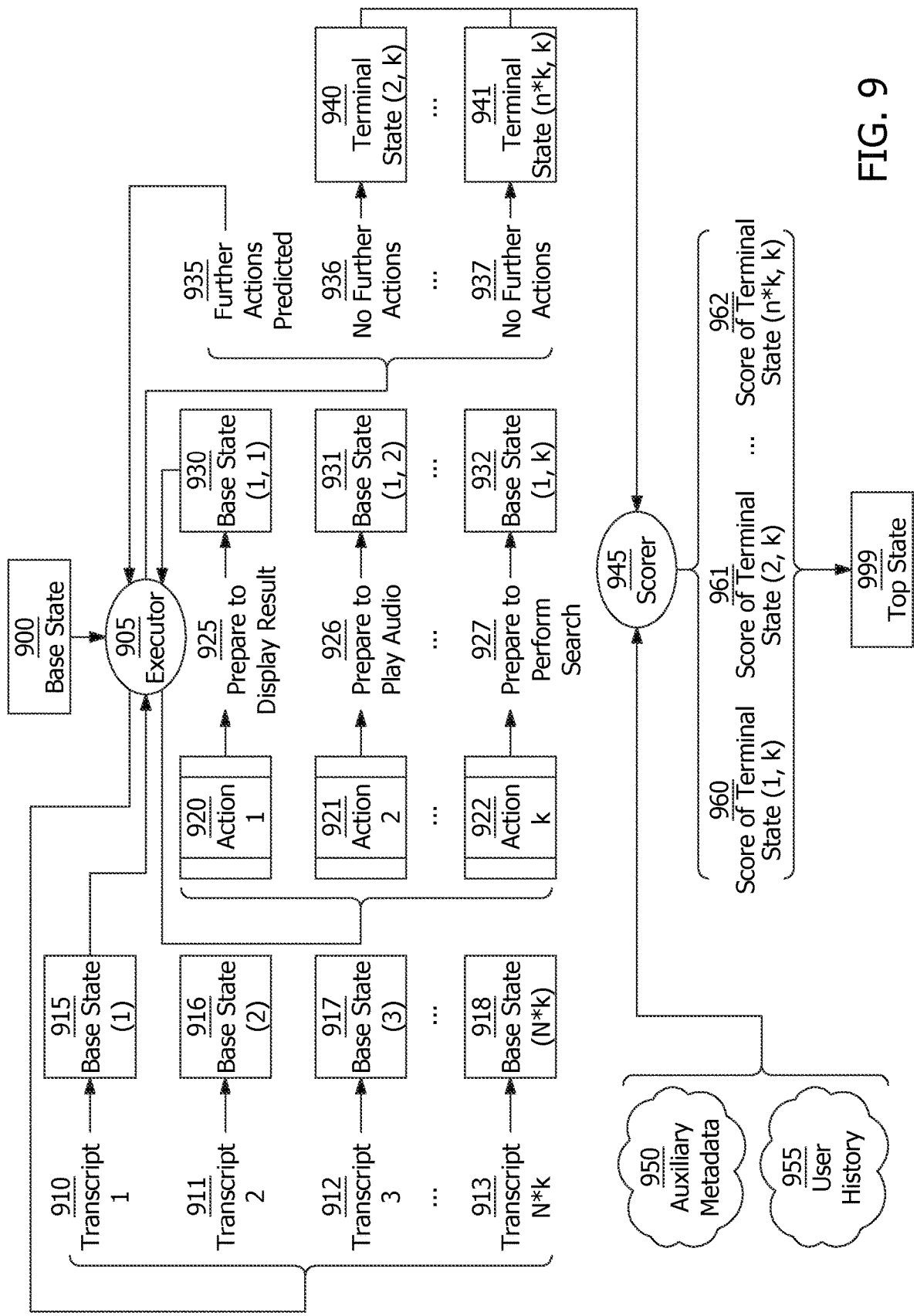
FIG. 9 illustrates the manner by which one branch of possible results paths traverses the tree of results.

As illustrated in FIG. 7, the executor can maintain multiple branches. Each branch defines possible user meanings and contexts, yielding its own actions, which lead to results, thus forming a tree of results. These results have their own intermediate or terminal states. The term "state" is generally defined as a point in the interaction between the user and the virtual assistant. FIG. 9 illustrates the how one branch of possible results paths traverses the tree of results. A user input, such as the voice command "Harry Potter", generates a base state, which becomes another base state in the interpretation phase, and yet another base state in the action and results phase, until it is finally designated as a terminal state and enters the scoring phase to reach its top state.

More specifically, the input (the unique identifier or request) of the user is designated as the initial base state 900. In the interpretation phase 970, the executor 905 applies the top N*k possible transcription hypotheses to the initial base state 600 in parallel 910-913. The executor 905 assumes each possible transcription is the correct input and forks the state. The result is N*k subsequent base states 915-918, one for each applied transcription hypothesis 910-913.

In the action phase 972, the executor 905 predicts all possible actions for each subsequent base state 915-918 in parallel. One or more of the actions 920-922 may be idempotent and reversible. In one embodiment, the executor 605 selects a top number (such as 3) of actions for the results phase discussed above. FIG. 9 illustrates the top k actions 920-933 for subsequent base state (1) 615 only.

In the results phase 972 the results for each action 925-927 are prepared but not actualized. For example, if one action 920 comprises a search, then the search results 925 may be prepared for display but are not yet displayed to the user. If another action 921 comprises playing an audio 925, that audio clip may be prepared for output. The actions 920-922 result in k new subsequent base states 930-932. As mentioned above, FIG. 9 illustrates the new base states 930-932 for the top k actions 920-933 for base state (1) 615 only.

The executor 905 may determine that some of the base states require further actions, such as base state (1,1) 630 and corresponding prediction 635. In that case, the executor repeats the action phase 972 and results phase 974 for that base state to create new subsequent base states. In one embodiment, the executor 905 can either be configured to time out after a certain amount of time has elapsed, or utilize a different heuristic based upon the running set of result states to determine that hypothetical reasoning should cease.

If, on the other hand, the executor 905 determines some base states do not require further actions, such as base states (1,2) 631, base state (1,k) 632, and corresponding predictions 636, 637, then the base states 631, 632 enter the terminal phase 976, such that these states are designated as terminal states 940, 941, and then enter the scoring phase. As mentioned above, FIG. 9 illustrates terminal results of the top k actions 920-933 for base state (1) 615 only.

In the scoring phase 978, a scorer 945 receives the one or more terminal states from the terminal results phase 976 and assigns a score to every terminal state 660-662. The scorer 945 may consider all steps taken as part of generating a state 600-641, as well as auxiliary metadata 950 and any user history 955 such as user profile, user preferences, and previously saved actions or results.

The terminal state with the highest score is designated as the top state 999 and is actualized. Actualization of a state means the action associated with that state is carried out permanently, and the prepared result is output to the user. For example, if the base state 931 was designated as the top state 999, then the action 921 is actualized and the prepared audio (such as a song) 926 is presented to the user via output. In one embodiment, actualized results are stored in the user history 955 to avoid repetition and facilitate personalization. In one embodiment, a top number (such as 3) of results are actualized (not illustrated in FIG. 9).

In one embodiment, the executor 905 can execute action phases, result phases, and terminal phases in parallel such that some base states are designated as terminal states, while other subsequent base states continue to generate new actions and results. In one embodiment, the executor 905 also executes scoring phases in parallel with other phases such that existing terminal states receive their scores while other base states are still entering new action and result phases. In one embodiment, the top state changes as new terminal states receive their scores. In one embodiment, output to the user is updated or added as new top states emerge.

To carry out search results from a hypothetical reasoning perspective, it may be required that a search engine be capable of handling queries that have a special branching form or that the search engine carry out searches for numerous different interpretations to obtain search results for the various different interpretations. In one embodiment, the method and system disclosed herein has its own search engine internally capable of carrying out these queries, but in other embodiments other search engines may be utilized. This in turn may involve indexing the web for all items that might be searched for and distilling them into a metadata representation that improves hypothetical reasoning.

Figure 10:
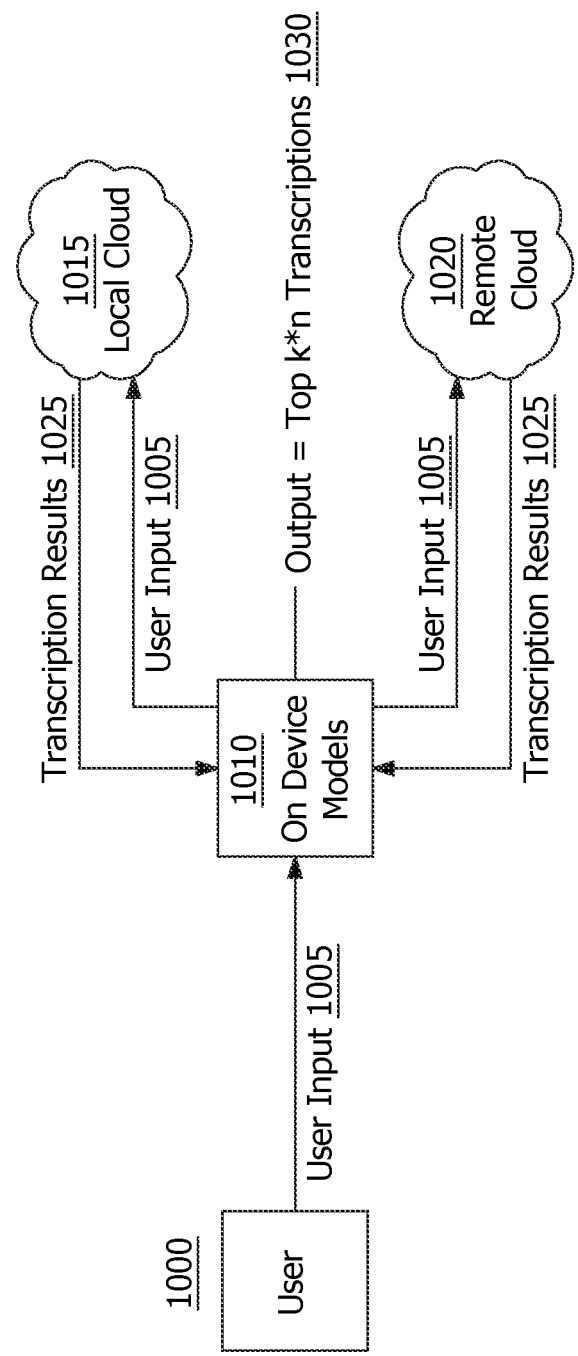
FIG. 10 illustrates the hardware interaction during the interpretation phase.

FIG. 10 illustrates the hardware interaction during the interpretation phase. As discussed above, the executor, the agents, the skills, and skill modules can all be mounted separately and can all operate on a device or in a cloud system, or both. FIG. 10 illustrates an example where the executor is mounted in the device 1010, while agents used for the interpretation phase are located in one or more local clouds or databases 1015 and one or more remote clouds or databases 1020. The user 1000 interacts with the device 1010 containing by user input, such as but not limited to voice, text, images, video, or any other type of user input 1005. The device 1010 may interact with local clouds or databases 1015 or remote clouds or databases 1020. In one embodiment, such interaction comprises the device 1010 transmitting user input 1005 to the clouds or databases 1015, 1020, and the clouds or databases 1015, 1020 transmitting transcription results 1025 back to the device 1010. At the conclusion of this stage, the output is a top-k list of possible transcriptions for each of the N languages considered, for a total N*k possible transcriptions or interpretation of the user's voice or vision input 1005.

Figure 11A:
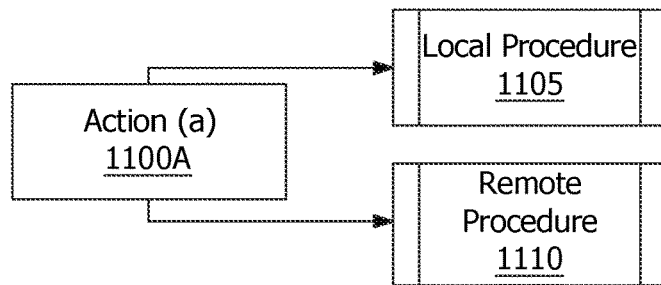
FIG. 11A, FIG. 11B, FIG. 11C, FIG. 11D illustrate various methods of actualization.
Figure 11B:
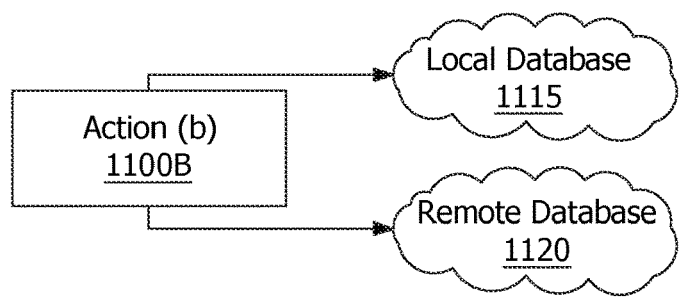
Figure 11C:
Figure 11D:
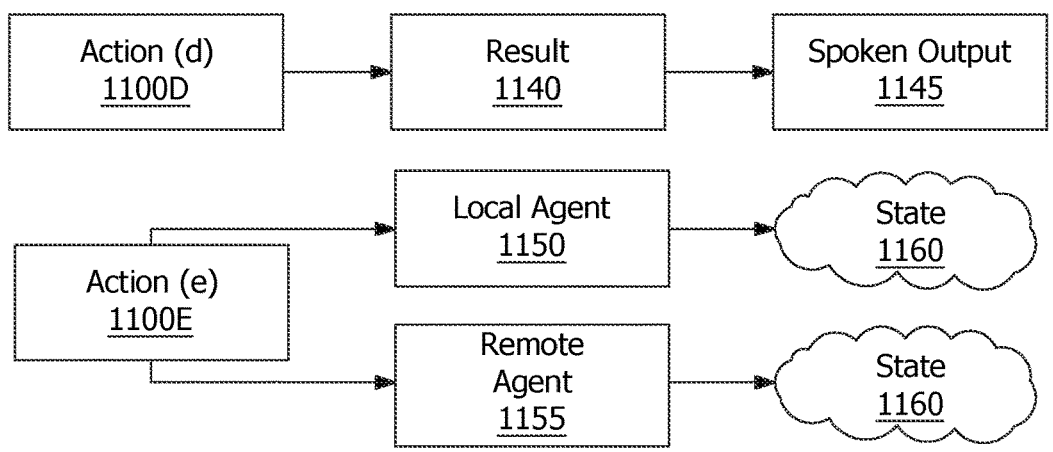

As discussed above, when a terminal state is designated as the top state, the executor actualizes the action and outputs the result of that top state. The top state is actualized wherein all actions that were assumed carried out as part of the reasoning to reach the terminal state are executed and output to the user by means of audio, visual or haptic feedback. FIGS. 11A, 11B, 11C, 11D illustrate various methods of actualization. As shown in FIG. 11A, the action 1100A may call local or remote procedures 1105, 1110. As shown in FIG. 11B, the action 1100B may connect to local or remote databases 1115, 1120 to modify or fetch data. As shown in FIG. 11C, the action 1100C may perform searches on local or remote search engines or in local or remote databases 1125, 1130 to deliver search results 1135. As shown in FIG. 11D, the action 1100D may prepare an existing result 1140 (such as a result stored in user history, as discussed above) for output 1140 (such as playing a saved audio file). As shown in FIG. 11E, the action 1100E maybe connect with local or remote agents 1150, 1155 to create new states or modify existing states 1160.

One or more or all states that could have also been selected for actualization are stored in the executor. When a new user input is received the following method is used to continue the conversation forward: (1) assume each possible terminal state from the previous turn was correct; (2) create a copy of that state and take the new top N*k input hypothesis as input in order to execute parallel hypothetical reasoning; and (3) once parallel hypothetical reasoning has been carried out with each possible previous state as the root, then execute the scoring procedure as defined above to select the top state to continue the conversation.

Figure 12A:
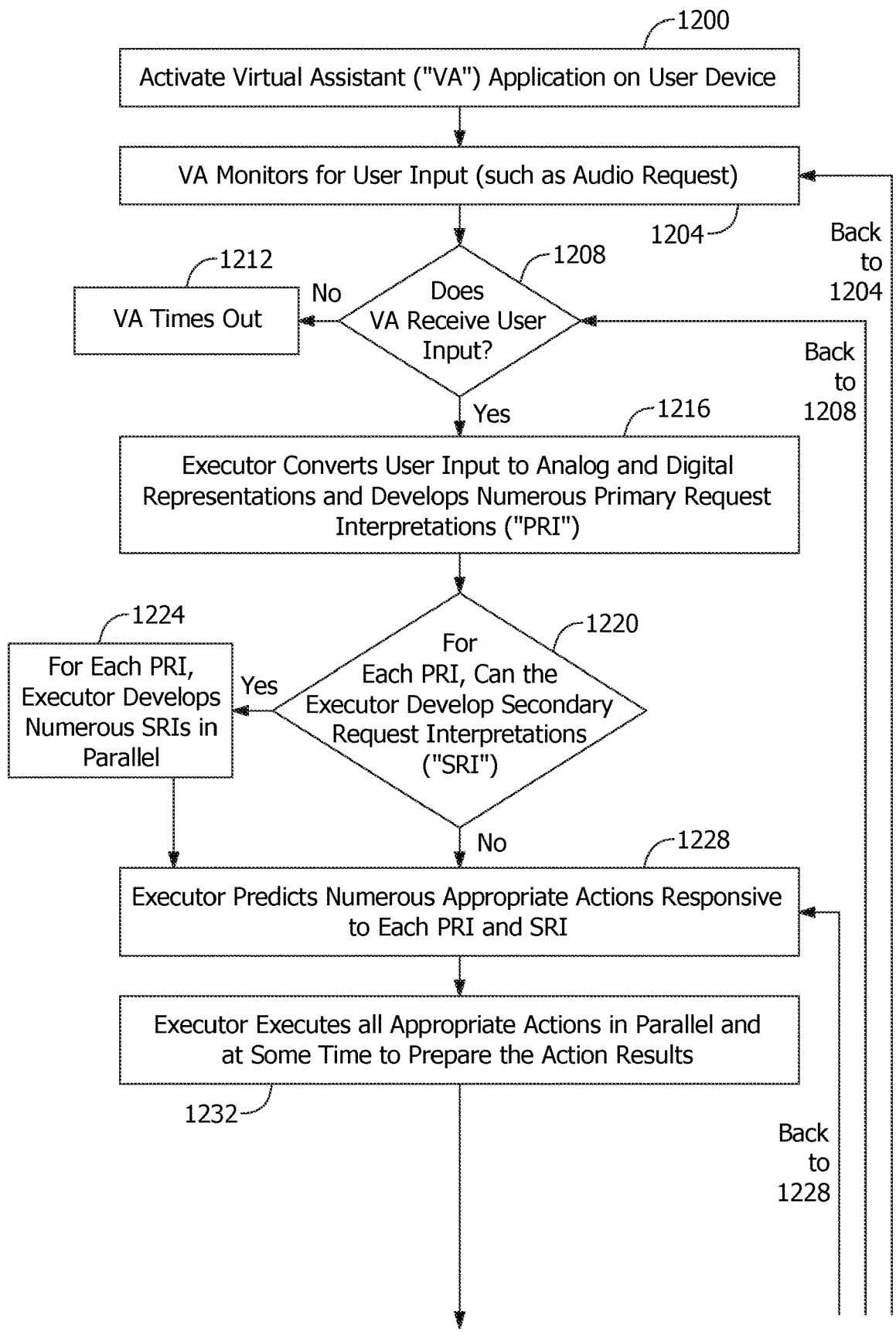
FIG. 12A and FIG. 12B illustrate an exemplary operational flow diagram of one possible method of operation.
Figure 12B:
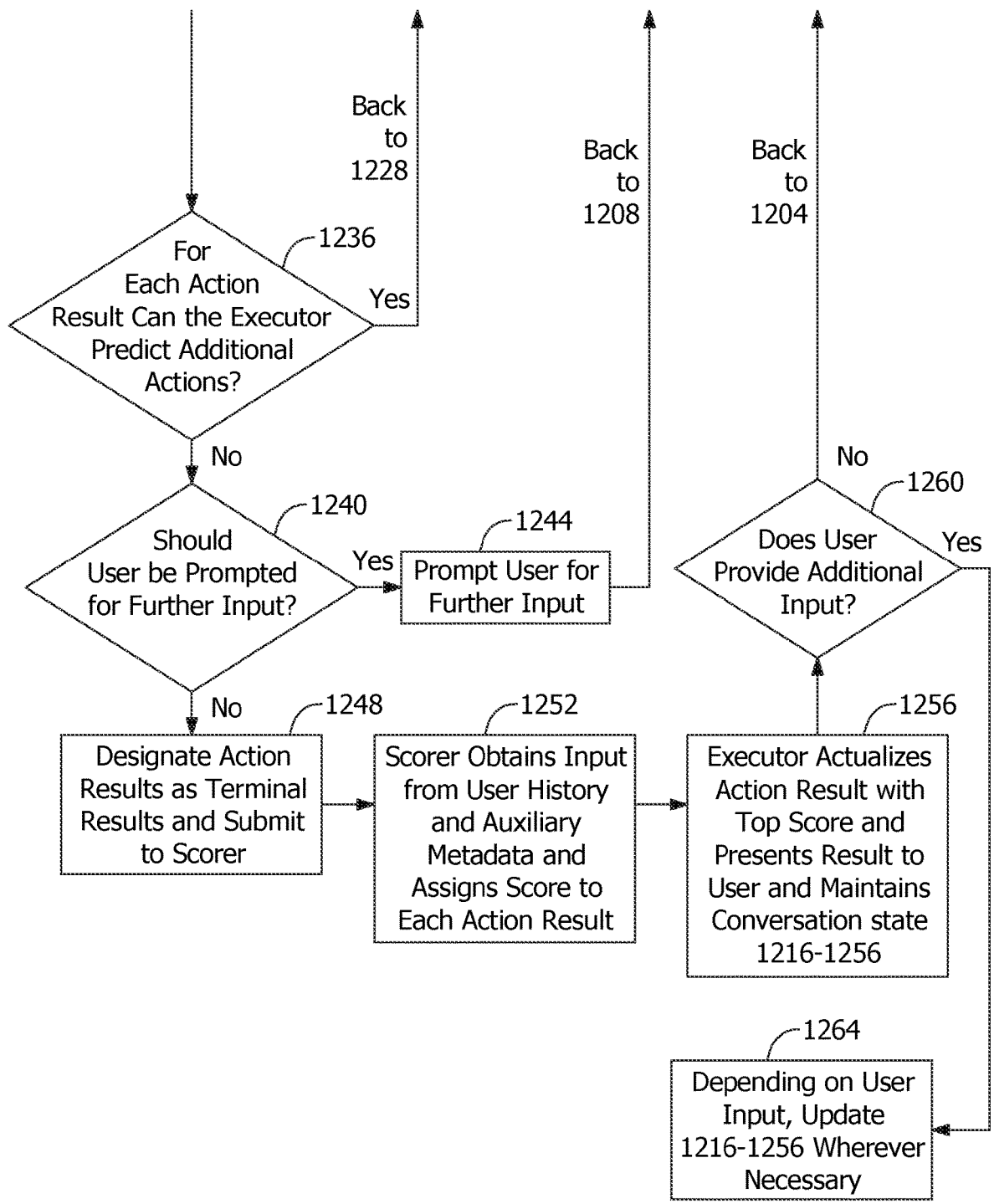

FIGS. 12A and 12B illustrate an exemplary operational flow diagram of one possible method of operation. In a step 1200, the virtual assistant is activated on a user device. This step assumes the user device itself is already in operation. In one embodiment, the virtual assistant is preinstalled on the user device and activates whenever the user device itself is operating. In another embodiment, the virtual assistant is installed on the user device later (such as via software download and installation, or via direct or indirect connection to another device operating the virtual assistant). In one embodiment, the virtual assistant is automatically activated upon successfully installation. In yet another embodiment, the virtual assistant requires further activation such as a user selection of a "start" function. As discussed previously, the virtual assistant (and more specifically the executor) can, but not necessarily have to be mounted or installed inside the user device.

In a step 1204, upon activation the virtual assistant enters stand-by mode and monitors for user input. User input may be direct (such as the user sending a command to the user device via voice, text, images, video, or any other input method) or indirect (such as a direct user input to an intermediate device such as a smartwatch, whereupon the smartwatch communicates to the user device, such as a phone).

In one embodiment, the virtual assistant is on stand-by mode for as long as the user device itself is operating. In another embodiment, as illustrated in steps 1208-1212, the improved virtual assistant may be set to enter a time-out mode after a period of inactivity (e.g., no user input). The time-out mode causes the virtual assistant to stop cease the current session and return to step 1204 and monitor for user input or go into a sleep state. This is a desirable feature on many user devices to conserve resources such as power and data.

In one embodiment, the virtual assistant may stay in time-out mode until the user performs further activation such as is discussed in step 1200. In another embodiment, the virtual assistant stays in time-out mode until the user performs any activity on a user device. For example, if a user goes to sleep and stops using his phone for eight hours, the virtual assistant may enter time-out mode. When the user wakes the next morning and begins to browse the news on their phone, the virtual assistant automatically exits time-out mode and enters stand-by mode. In yet another embodiment, the user may command the virtual assistant to enter time-out mode by user input.

In a step 1216, upon receiving user input, the virtual assistant enters the interpretation phase, such that the user input is converted into primary request interpretations. More specifically, the executor transmits the user input to local and remote databases and receives one or more transcript results, then outputs N*k possible transcriptions in parallel. FIG. 12A refers to these N*k possible transcriptions as primary request interpretations ("PRIs").

In a step 1220, the executor evaluates whether each PRI requires further interpretation. If so, in a step 1224, the executor develops secondary request interpretations ("SRIs") in parallel. Using the example discussed in FIG. 7, where a user attempts to enter a voice command input of "Harry Potter" but does not do so clearly, the executor may generate "harry water" as a PRI, and then develops "harry water", "Harry Potter", and "hairy spotter" as SRIs. In one embodiment, SRIs are evaluated for further interpretation, such that the executor may develop tertiary request interpretations, quaternary request interpretations, and so on. In one embodiment, the executor is set to exit the interpretation phase when a top number of rounds of interpretations are developed (for example, exit the interpretation phase upon developing tertiary request interpretations).

In a step 1228, the executor enters the action phase, where the executor predicts numerous appropriate actions responsive to each PRI and SRI. In one embodiment, the executor predicts actions responsive to only the top number (such as 3) of PRIs and SRIs. The executor can run the interpretation phase and the action phase simultaneously, such that PRIs enter the action phase while SRIs are developed.

In a step 1232, the executor enters the results phase, where the executor executes the appropriate actions in parallel and generally simultaneously or generally concurrently to prepare the action results. In some embodiments, the actions could execute sequentially, but that would slow operation. For example, if an appropriate action is to play a song, the executor prepares an audio file of the song for output but does not play the song. In one embodiment, the executor only executes a top number (such as 3) of actions for each PRI or SRI.

In a step 1236, one or more action results may cause the executor to predict additional actions. If an action result requires additional actions, steps 1228-1232 are repeated. For example, the initial action may be to generate a list of song titles. The list of song titles may require an additional action of retrieving all, or a top number (such as 3), of songs to be prepared for output.

In one embodiment, as illustrated by a step 1240, the executor determines whether the user should be prompted for further input. If so, in step 1244 the executor may output a prompt to the user (such as by audio or text notification) to request further input, and steps 1204 to 1236 are repeated. Using the example above where an initial action may be to generate a list of song titles, the executor may prompt the user to confirm whether the user wishes to perform the additional action of retrieving one or more songs. In one embodiment, steps 1240-1244 may be performed at any point between steps 1216-1264.

In a step 1248, where no additional actions can be predicted for an action result, the executor enters the terminal result phase. In the terminal result phase, action results with no additional actions are designated as a terminal result and submitted to a scorer for the scoring phase.

In the scoring phase of a step 1252, the scorer appends a score to all terminal results. To determine each score, the scorer considers (1) all steps 1216-1248 taken as part of generating the terminal result, (2) the auxiliary metadata (any data not specifically related to the user), and (3) the user history (such as user profile, user preferences, and previously saved actions or results). For example, based on a user input of "Harry Potter", all Harry Potter-related book titles, movie titles, and game titles may receive equal scores. However, data from the user history may suggest the user frequently plays or asks about video games. As a result, game titles may receive a higher score than book titles and movie titles. Auxiliary metadata may further suggest a new video game featuring Harry Potter has just been released, titled "Hogwarts Mystery". As a result, "Hogwarts Mystery" may receive an even higher score than other game titles. In one embodiment, the executor can run scoring phases in parallel with other phases such that existing terminal results receive their scores while other action results are still entering new action and result phases.

In a step 1256, the executor actualizes the terminal result with the top score. As discussed above, actualization means the action associated with that terminal result is executed, and the result is presented to the user. For example, if a song is determined as the terminal result with the top score, the previously prepared audio file of that song is played to the user. In one embodiment, the top state changes as new terminal results receive their scores. In one embodiment, output to the user is updated or added as new top score results emerge. In one embodiment, a top number (such as 3) of results are actualized.

The executor may be configured to maintain the conversational state throughout steps 1216-1256, even after a terminal result receives a top score and is presented to the user. A conversational state is the state as it relates to the interaction with the user. In one embodiment, the executor maintains a conversational state indefinitely. In another embodiment, as shown in a step 1260, the executor is set to terminate the conversational state after a period where the user provides no further input. Upon termination of the conversational state, the improved virtual assistant returns to the stand-by mode, as discussed in step 1204. If, on the other hand, the user does provide input, as shown in step 1264, the executor may update and/or adjust steps 1216-1256 accordingly.

The ability to maintain conversational states is another improvement over the prior art. In one embodiment, the conversational state contains the history of what the user has said in the current session, the history of what the agent/executor has said the current session, and the results that the user has seen the current session as well as associated metadata (the movie title, the actors in a movie, etc.). A persisted conversational state corresponds to a persistent conversational state that lives beyond the scope of a single dialogue interaction. The method and system disclosed herein maintains state information and data during the interaction with the user thereby allowing the system to develop multiple branches to determine which branch will yield the best result, which often cannot be determined until actual results are determined. This process also allows the system or user to jump or backtrack to a different branch for any reason, such as further user input or based on unsatisfactory search results. The persistent conversational state also allows the user to continue with the same virtual interaction by bringing up the same topic again, at a later time, to restore the conversational state. In various embodiments, the later time could be minutes, hours, days, or weeks.

For example, upon receiving the top result of a suggestion of the game title "Hogwarts Mystery", the user may enter a new voice command such as "I want movies, not games". The executor would then backtrack to step 1248 and append higher scores to a movie result. Alternatively, the executor may abandon paths which are not related to movies, and further develop the movie paths.

Individual skills can maintain their own interpretation of the conversational state as well as query other skills/agents conversational state interpretations. This conversational state is persisted both for the duration of the current conversational session as well as over the entire course of the user's history. This historical conversational state across all agents may be persisted into both a client and a cloud database. This persisted conversational state can be queried by agents to form a personalized profile for use in augmenting input. This combined user profile is an advancement over the prior art in which each skill is required to maintain in isolation a representation of the user's profile.

Figure 13:
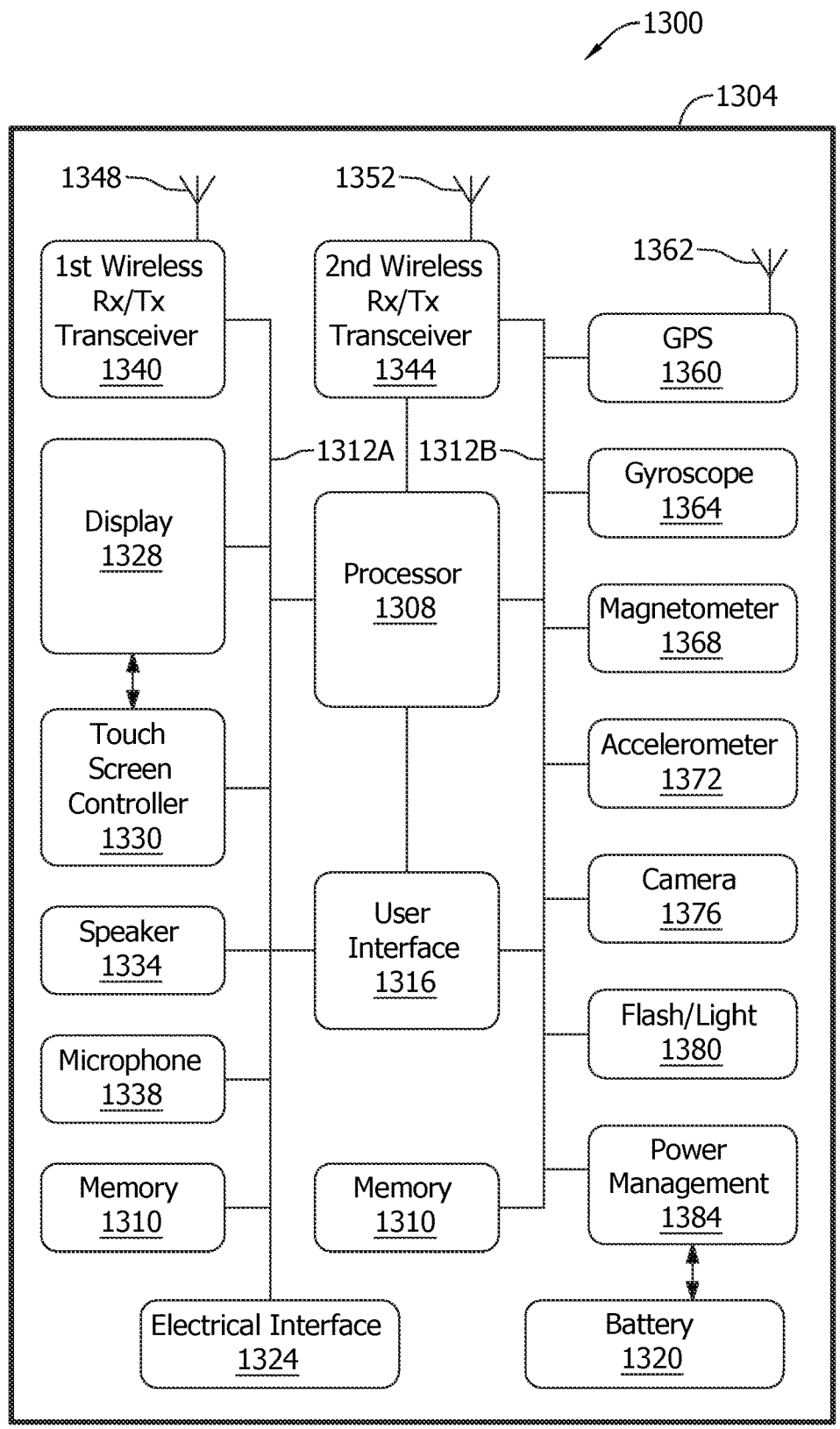
FIG. 13 illustrates a block diagram of an exemplary user device.
Figure 14:
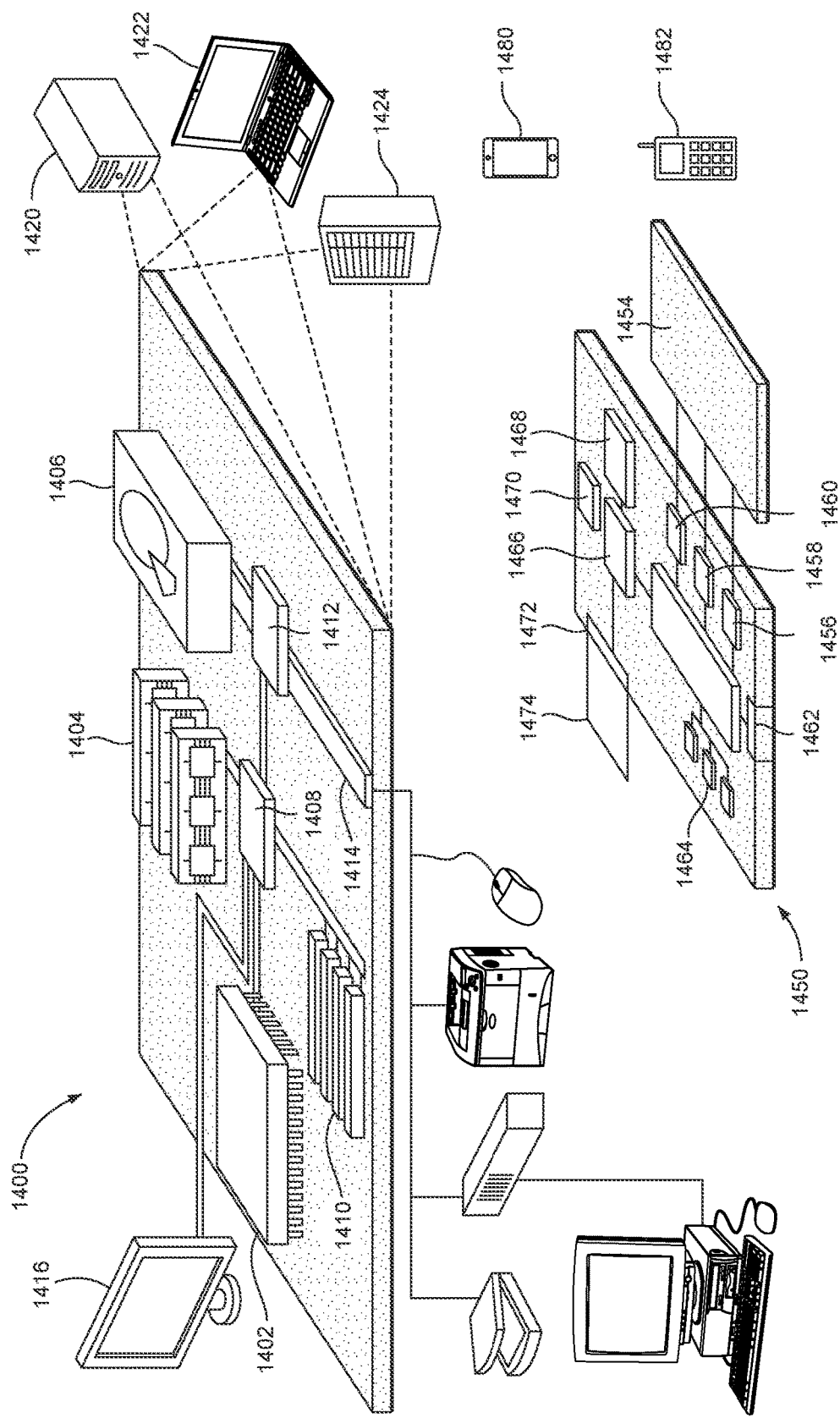
FIG. 14 illustrates an example embodiment of a computing, mobile device, or server in a network environment.

As shown in FIGS. 13 and 14, the system includes network connection over which network traffic and data are exchanged. Also part of the system are one or more servers and one or more databases. The databases may be associated with the servers, the user device, or may be third party databases. The user device of the system is composed of a user facing device capable of mixed input methods, either in audio or visual, a camera and/or microphone. Additionally, it can have some mixed form of display for the user in the form of lights, display, speakers, or haptics. The device may either be in a handheld, fixed installation, as in a TV or wall mounted item, or moveable item form factor, such as in a tabletop display. This device may either be activated by the user or prompt the user that it is active if the internal system determines it should be listening. The activation process can be triggered by a combination of audio-visual signals. Once activated the device transitions into a listening state in which it is recording audio for purposes of transcription. Any component of the system may transcribe or translate audio to text using a combination of models. These models are 1 per language and dialect (e.g., US-Spanish and Spain-Spanish would be considered separate models).

FIG. 13 illustrates an example embodiment of a mobile device, also referred to as a user device which may or may not be mobile. This is but one possible mobile device configuration and as such it is contemplated that one of ordinary skill in the art may differently configure the mobile device. The mobile device 1300 may comprise any type of mobile communication device capable of performing as described below. The mobile device may comprise a PDA, cellular telephone, smart phone, tablet PC, wireless electronic pad, an IoT device, a "wearable" electronic device or any other computing device.

In this example embodiment, the mobile device 1300 is configured with an outer housing 1304 configured to protect and contain the components described below. Within the housing 1304 is a processor 1308 and a first and second bus 1312A, 1312B (collectively 1312). The processor 1308 communicates over the buses 1312 with the other components of the mobile device 1300. The processor 1308 may comprise any type processor or controller capable of performing as described herein. The processor 1308 may comprise a general purpose processor, ASIC, ARM, DSP, controller, or any other type processing device. The processor 1308 and other elements of the mobile device 1300 receive power from a battery 1320 or other power source. An electrical interface 1324 provides one or more electrical ports to electrically interface with the mobile device, such as with a second electronic device, computer, a medical device, or a power supply/charging device. The interface 1324 may comprise any type electrical interface or connector format.

One or more memories 1310 are part of the mobile device 1300 for storage of machine-readable code for execution on the processor 1308 and for storage of data, such as image data, audio data, user data, location data, accelerometer data, or any other type of data. The memory 1310 may comprise RAM, ROM, flash memory, optical memory, or micro-drive memory. The machine-readable code (software modules and/or routines) as described herein is non-transitory.

As part of this embodiment, the processor 1308 connects to a user interface 1316. The user interface 1316 may comprise any system or device configured to accept user input to control the mobile device. The user interface 1316 may comprise one or more of the following: microphone, keyboard, roller ball, buttons, wheels, pointer key, camera (still and video), touch pad, and touch screen. A touch screen controller 1330 is also provided which interfaces through the bus 1312 and connects to a display 1328.

The display comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 1328 receives signals from the processor 1308 and these signals are translated by the display into text and images as is understood in the art. The display 1328 may further comprise a display processor (not shown) or controller that interfaces with the processor 1308. The touch screen controller 1330 may comprise a module configured to receive signals from a touch screen which is overlaid on the display 1328.

Also part of this exemplary mobile device is a speaker 1334 and microphone 1338. The speaker 1334 and microphone 1338 may be controlled by the processor 1308. The microphone 1338 is configured to receive and convert audio signals to electrical signals based on processor 1308 control. Likewise, the processor 1308 may activate the speaker 1334 to generate audio signals. These devices operate as is understood in the art and as such are not described in detail herein.

Also connected to one or more of the buses 1312 is a first wireless transceiver 1340 and a second wireless transceiver 1344, each of which connect to respective antennas 1348, 1352. The first and second transceiver 1340, 1344 are configured to receive incoming signals from a remote transmitter and perform analog front-end processing on the signals to generate analog baseband signals. The incoming signal maybe further processed by conversion to a digital format, such as by an analog to digital converter, for subsequent processing by the processor 1308. Likewise, the first and second transceiver 1340, 1344 are configured to receive outgoing signals from the processor 1308, or another component of the mobile device 1308, and up convert these signals from baseband to RF frequency for transmission over the respective antenna 1348, 1352. Although shown with a first wireless transceiver 1340 and a second wireless transceiver 1344, it is contemplated that the mobile device 1300 may have only one such system or two or more transceivers. For example, some devices are tri-band or quad-band capable, or have Wi-Fi, Bluetooth®, NFC, or other communication capability.

It is contemplated that the mobile device, and hence the first wireless transceiver 1340 and a second wireless transceiver 1344 may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 1312B which also interfaces with the processor 1308. These devices include a global positioning system (GPS) module 1360 with associated antenna 1362. The GPS module 1360 is capable of receiving and processing signals from satellites or other transponders to generate location data regarding the location, direction of travel, and speed of the GPS module 1360. GPS is generally understood in the art and hence not described in detail herein. A gyroscope 1364 connects to the bus 1312B to generate and provide orientation data regarding the orientation of the mobile device 1304. A magnetometer 1368 is provided to provide directional information to the mobile device 1304. An accelerometer 1372 connects to the bus 1312B to provide information or data regarding shocks or forces experienced by the mobile device. In one configuration, the accelerometer 1372 and gyroscope 1364 generate and provide data to the processor 1308 to indicate a movement path and orientation of the mobile device.

One or more cameras (still, video, or both) 1376 are provided to capture image data for storage in the memory 1310 and/or for possible transmission over a wireless or wired link or for viewing at a later time. The one or more cameras 1376 may be configured to detect an image using visible light and/or near-infrared light. The cameras 1376 may also be configured to utilize image intensification, active illumination, or thermal vision to obtain images in dark environments. The processor 1308 may process machine readable code that is stored in a non-transitory state or transitory state on the memory to perform the functions described herein.

A flasher and/or flashlight 1380, such as an LED light, are provided and are processor controllable. The flasher or flashlight 1380 may serve as a strobe or traditional flashlight. The flasher or flashlight 1380 may also be configured to emit near-infrared light. A power management module 1384 interfaces with or monitors the battery 1320 to manage power consumption, control battery charging, and provide supply voltages to the various devices which may require different power requirements.

FIG. 14 is a schematic of a computing or mobile device, or server, such as one of the devices described above, according to one exemplary embodiment. Computing device 1400 is intended to represent various forms of digital computers, such as smartphones, tablets, kiosks, laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 1400 includes a processor 1402, memory 1404, a storage device 1406, a high-speed interface or controller 1408 connecting to memory 1404 and high-speed expansion ports 1410, and a low-speed interface or controller 1412 connecting to low-speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high-speed controller 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is one or more volatile memory units. In another implementation, the memory 1404 is a non-volatile memory unit or units. The memory 1404 may also be another form of computer-readable medium, such as a magnetic or optical disk.

The storage device 1406 can provide mass storage for the computing device 1400. In one implementation, the storage device 1406 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high-speed controller 1408 manages bandwidth-intensive operations for the computing device 1400, while the low-speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed bus 1414. The low-speed bus 1414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in several different forms. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a micro-drive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In-Line Memory Module) card interface. Such expansion memory 1474 may provide extra storage space for device 1450 or may also store applications or other information for device 1450. Specifically, expansion memory 1474 may include instructions to carry out or supplement the processes described above and may include secure information also. Thus, for example, expansion memory 1474 may be provide as a security module for device 1450 and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, a GPS (Global Positioning system) receiver module 1470 may provide additional navigation- and location-related wireless data to device 1450, which may be used, as appropriate, by applications running on device 1450.

Device 1450 may also communicate audibly using audio codec 1460, which may receive spoken information from a user and convert it to usable digital information, such as with speech recognition capability from a digital representation of an analog output from the microphone. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by software applications operating on device 1450.

The computing device 1450 may be implemented in several different forms, as shown in the figure. For example, it may be implemented as a cellular telephone 1482. It may also be implemented as part of a smart phone 1480, personal digital assistant, a computer tablet, computer, laptop, smart speakers, television, mechanical arm, or other similar mobile device.

Thus, various implementations of the systems and techniques described here can be realized in digital electronic circuitry, integrated circuitry, especially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium", "machine executable code" or "computer-readable medium" refers to any computer program product, apparatus and/or device (e.g., optical disks, flash drives, magnetic discs, optical disks, memory, Programmable Logic Devices (PLDs)) used to provide machine instructions and/or data to a processor, including a machine-readable medium that receives machine instructions as a machine-readable signal. The term "machine-readable signal" refers to any signal used to provide machine instructions and/or data to a programmable processor. These signals may be non-transitory or transitory.

To provide for interaction with a user, the systems and techniques described here can be implemented on a computer having a display device such as LCD (liquid crystal display) monitor), LED, OLED, for displaying information to the user and a keyboard and a pointing device (e.g., a mouse, joystick, trackball, or similar device) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 1400 and/or 1450) that includes a back end component (e.g., as a data server, slot accounting system, player tracking system, or similar), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include LAN, WAN, and the Internet.

The computing system can include clients and servers. A client and server are generally remote from each other and typically interact through a communication network. The relationship of client and server arises by virtue of computer programs running on the respective computers and having a client-server relationship to each other.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

When a user provides an input (user inquiry) to a voice assistant in the form of either text, audio, or image, the current virtual assistant will attempt to process the user inquiry in order to provide the user with a helpful and accurate response. The processing involves having the virtual assistant 'understand' what the user is asking or requesting and whether the virtual assistant can provide an answer or satisfy the request. One problem which arises is that the user inquiry may be determined to be out of scope and/or out of domain of the virtual assistant.

The scope of a virtual assistant consists of all possible responses a virtual assistant may generate to a user inquiry. A response (defined as a response or action) that a virtual assistant is not capable of generating is considered out of scope. For example, a user request for a virtual assistant to operate a microwave may be out of scope if the virtual assistant is not connected to a microwave or configured to operate a microwave. Likewise, a virtual assistant that is built to operate a microwave would not be capable of finding movies or music.

A domain of a virtual assistant consists of all related topics a virtual assistant may comprehend and thus process. A single assistant may be capable of handling many different domains. However, because a virtual assistant only understands which domains it does know, it does not have an understanding of that which it has never been exposed to. A user input that a virtual assistant cannot comprehend is considered out of domain. For example, virtual assistants may generally not be able to comprehend or process a user input that consists of incomprehensible noises or even word combinations which do not have a meaning. But a virtual assistant may try to find the closest topic in its domains for that random input because it assumes an input is something that it could handle.

Figure 15:
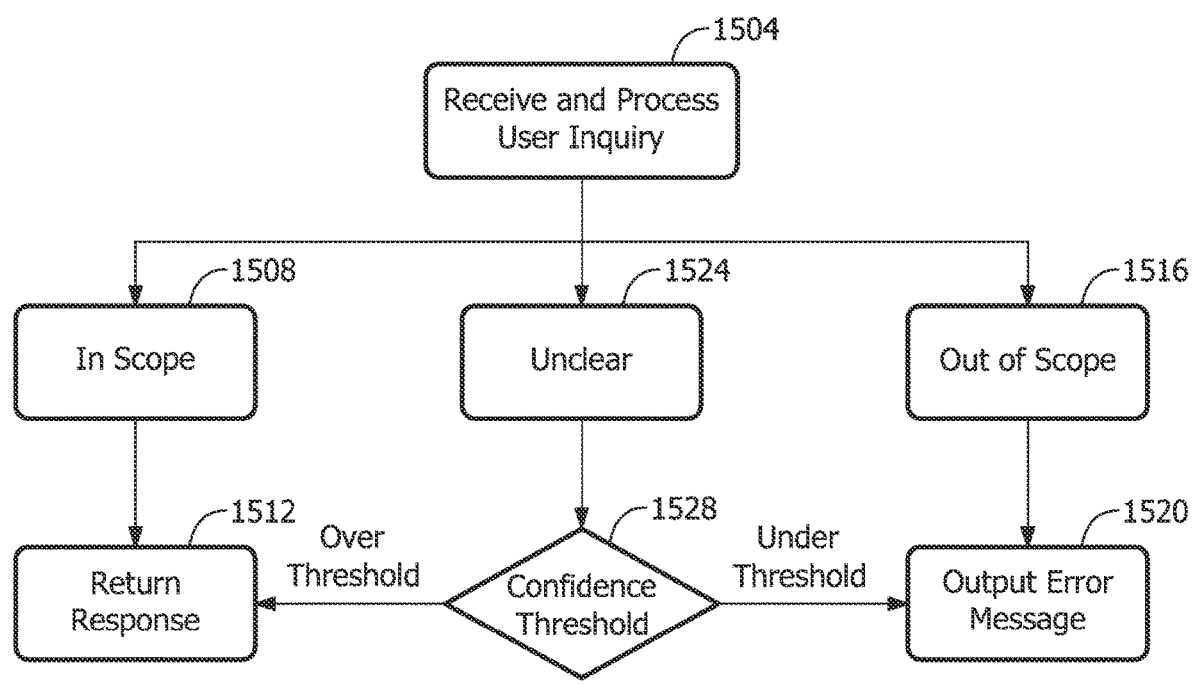
FIG. 15 illustrates conventional methods of handling out of scope inquiries.

FIG. 15 illustrates conventional methods of handling out of scope inquiries. In the past, virtual assistants may include a set of data definitions that define which inquiries may be in scope, and which may be out of scope. Thus, upon receiving and processing a user inquiry at a step 1504, the virtual assistant may classify the user inquiry into three categories: inquiries that are in scope, inquiries that are out of scope, and inquiries that are neither in scope nor out of scope (in other words, inquiries that cannot yet be defined by either set of data, i.e., being in or out of scope).

At a step 1508, inquiries classified as in scope are processed such that, at a step 1512, a response may be returned to the user. At a step 1516, inquiries classified as out of scope are processed such that, at a step 1520, an error message may be output to the user. At a step 1524, inquiries classified as neither in scope nor out of scope may be processed as an in scope inquiry at step 1512 by mapping the inquiry to the closest known capability the virtual assistant has, even though the closest mapping may not be confidently relevant, or the initial request was simply not understood.

Other current approaches to solve this problem include use of a confidence threshold at a step 1528, where the closest known capability is given a confidence rating. If the confidence rating of the closest known capability is above a predetermined threshold, then a response may be returned at step 1512. If the confidence rating is below the predetermined threshold, then an error message may be output to the user at step 1520. An accurate confidence threshold is difficult to calibrate using this approach, thereby limiting the virtual assistant's capabilities to provide any help in that scenario. Out of domain inquiries are prompts processed in a similar manner and face similar challenges.

Current Voice Assistants such as Siri®, Alexa®, and Google® take a limiting approach to addressing this problem. First, these systems define the scope of all possible capabilities that are supported. Typically, these are tasks such as "streaming", "video games", "banking", "messaging" and many more. When a user provides a new input (user inquiry) the model attempts to classify the input into one of those categories and assigns a confidence score between 0 and 100% to the classification. These systems determine if a result is low confidence. If the confidence is low, such as below a predetermined threshold, then the input is classified as Out-Of-Scope and the user is notified that an answer is not available. While this solution may reduce the chance of a user obtaining a response that is unrelated to the inquiry (i.e., clearly wrong), it avoids that response by simply returning no response at all. For anyone who has used a virtual assistant, far too often the virtual assistant returns an irrelevant response or no response. Depending on the confidence score and the threshold, the user is either provided a wrong answer, or no answer at all, and this is a drawback to the prior art. In many cases the user is just presented with a list of web search results of the exact text that the user input, which can be incomprehensible at times.

Figure 16:
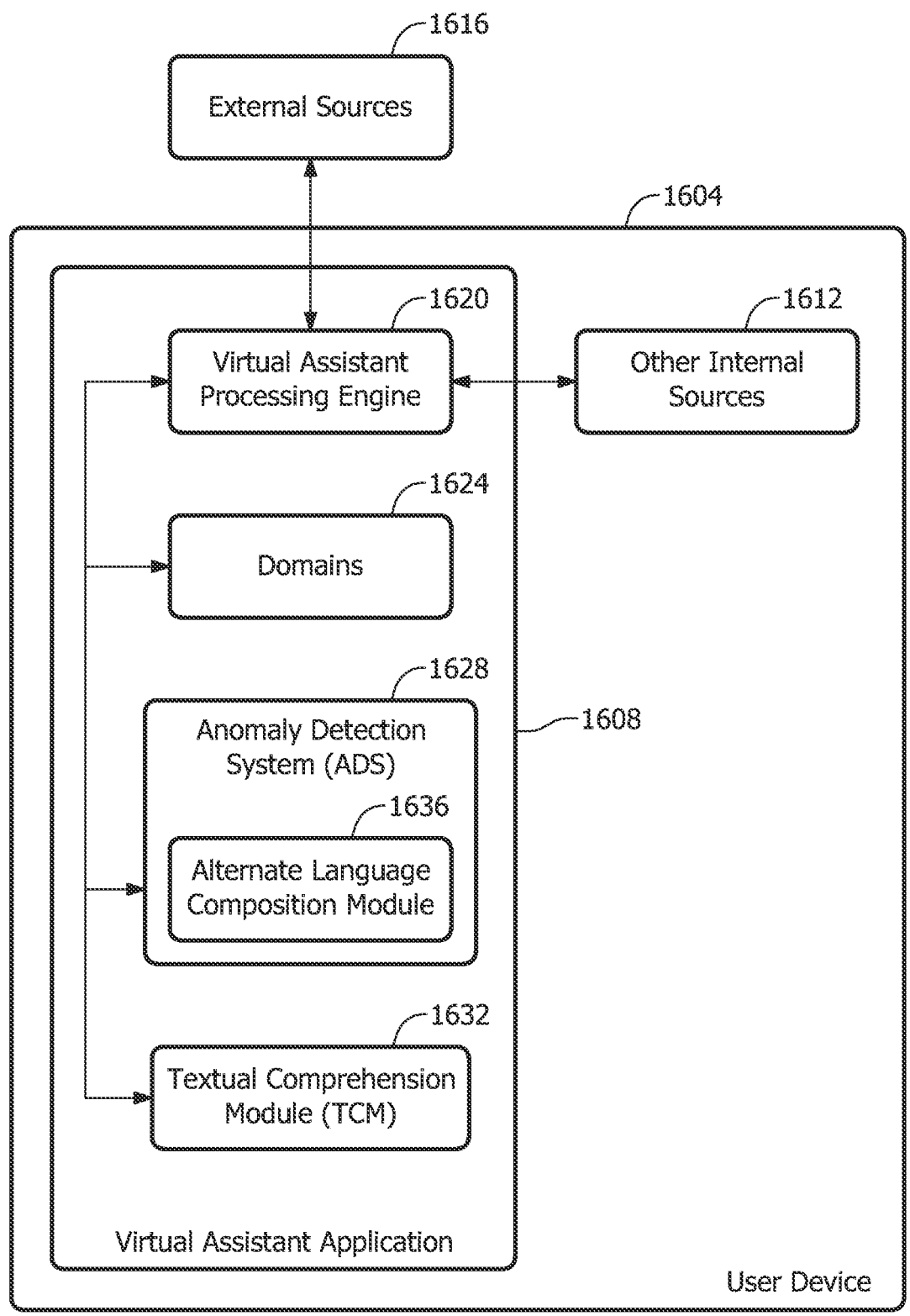
FIG. 16 illustrates an exemplary system of the improvement, wherein the virtual assistant is a software application on a user device.

The various embodiments disclosed herein present an improved solution. FIG. 16 illustrates an exemplary system, where the virtual assistant is a software application on a user device. In FIG. 16, a user device 1604 includes an improved virtual assistant application 1608 and various other internal sources 1612. Internal sources 1612 may include hardware, databases, and other software application installed on the user device 1604. For example, the internal sources may be a database that contains information, other applications, other virtual assistants, search engines or any other internal source of information which may be used by the virtual assistant. The virtual assistant application 1608 may be in communication with one or more internal sources 1612, as well as external sources 1616. External sources 1616 may include any device illustrated in FIG. 3 and described above (such as mobile devices 305, Bluetooth devices 306, and/or other devices 307), as well as software applications operating on these devices. The internal sources 1612 and external sources 1616 may comprise databases, search engines, virtual assistances, or any other resources that may be used by the virtual assistant 1608 to satisfy a user request for action or information. These other sources 1612, 1616 are known in the art and as such as not described in detail herein. As disclosed herein, the virtual assistant 1608 may send an inquiry to these other sources 1612, 1616 to seek information in the event the virtual assistant requires assistance in classifying, determining the scope request, or both, or satisfying the user request.

The virtual assistant may comprise numerous software modules, algorithms, functions, or features, which are utilized as described herein. The software modules may be referred to as machine executable code or instructions, which are stored on a memory in a non-transitory state, for execution by a processor. The virtual assistant application 1608 may include a virtual assistant processing engine 1620, which may process user inquiries using one or more domains 1624, the anomaly detection system ("ADS") 1628, and/or the textual comprehension module ("TCM") 1632

The domains 1624 are one or more datasets defining the possible topics the virtual assistant application 1608 may comprehend and process. These domains 1624 may be used to determine whether the virtual assistant application 1608 is able to comprehend and process the user inquiry without additional steps, and to calculate the confidence rating of each domain identified as one that which may be used to comprehend and process the user inquiry. In one embodiment, the domains of other internal sources 1612 may also be used to comprehend and process the user inquiry.

The ADS 1628 is software configured to process user inquiries which may not be comprehended with any domains 1624, or which may be comprehended with domains 1624 at a confidence rating below a predetermined threshold. The ADS 1628 may determine if such user inquiries may still be interpreted as a valid user inquiry for any virtual assistant, or if the user inquiry is truly incomprehensible. For example, the ADS 1628 may use the alternate language composition module 1636 to determine if the user inquiry may be understood in another language. The ADS 1628 may also use other functions to expand the user inquiry into a number of possible alternative interpretations, as shown in FIG. 7.

The TCM 1632 may be used to process user inquiries which may not be processed with any domains 1624, or which may be processed with domains 1624 at a confidence rating below a predetermined threshold. The TCM 1632 may reform the user inquiry into a question and may query the textual descriptions of the capabilities of the virtual assistant application 1608, the other internal sources 1612, and the external sources 1616 for answers.

Figure 17A:
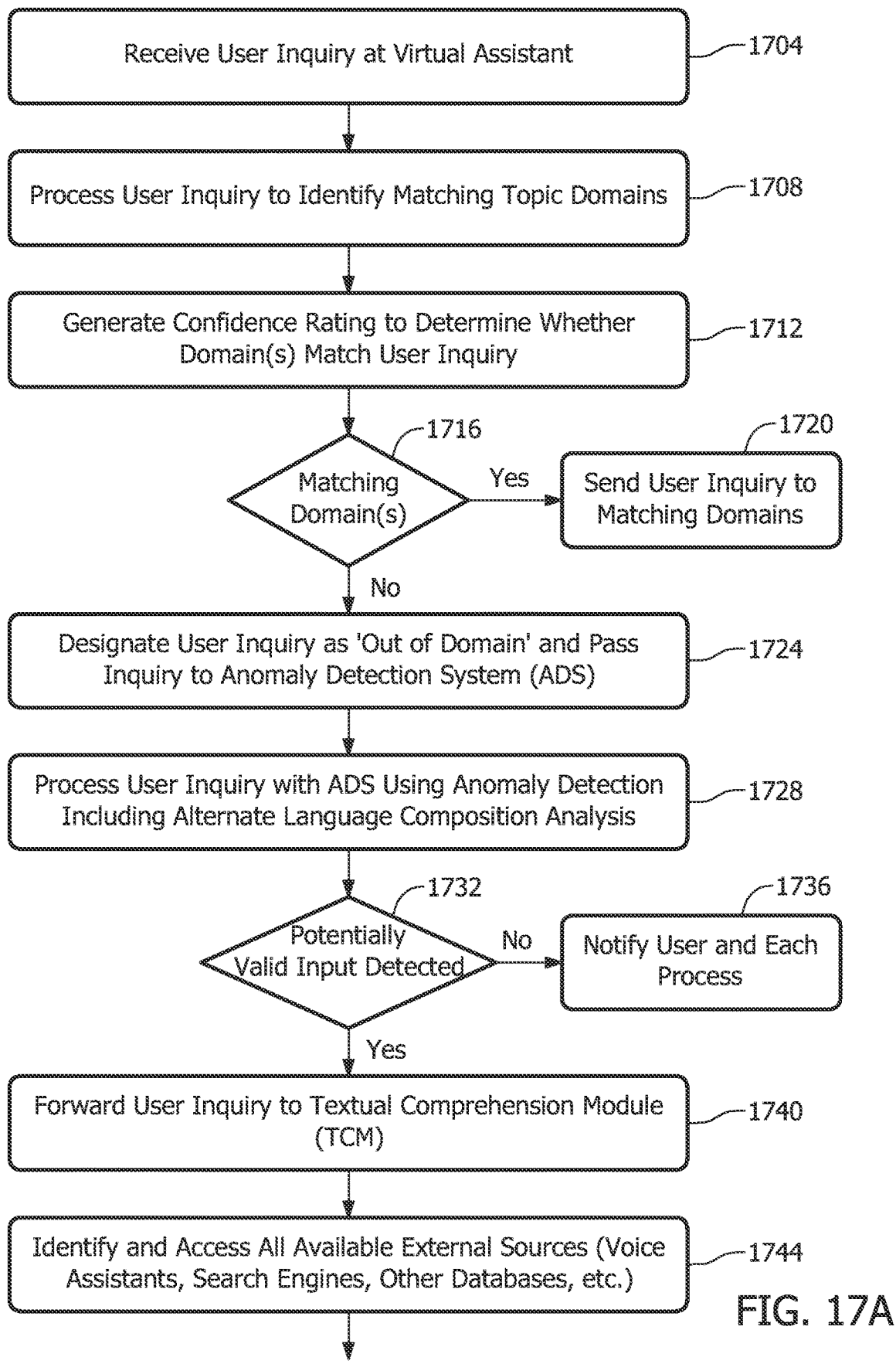
FIG. 17A illustrates the first part of an exemplary method of operation.
Figure 17B:
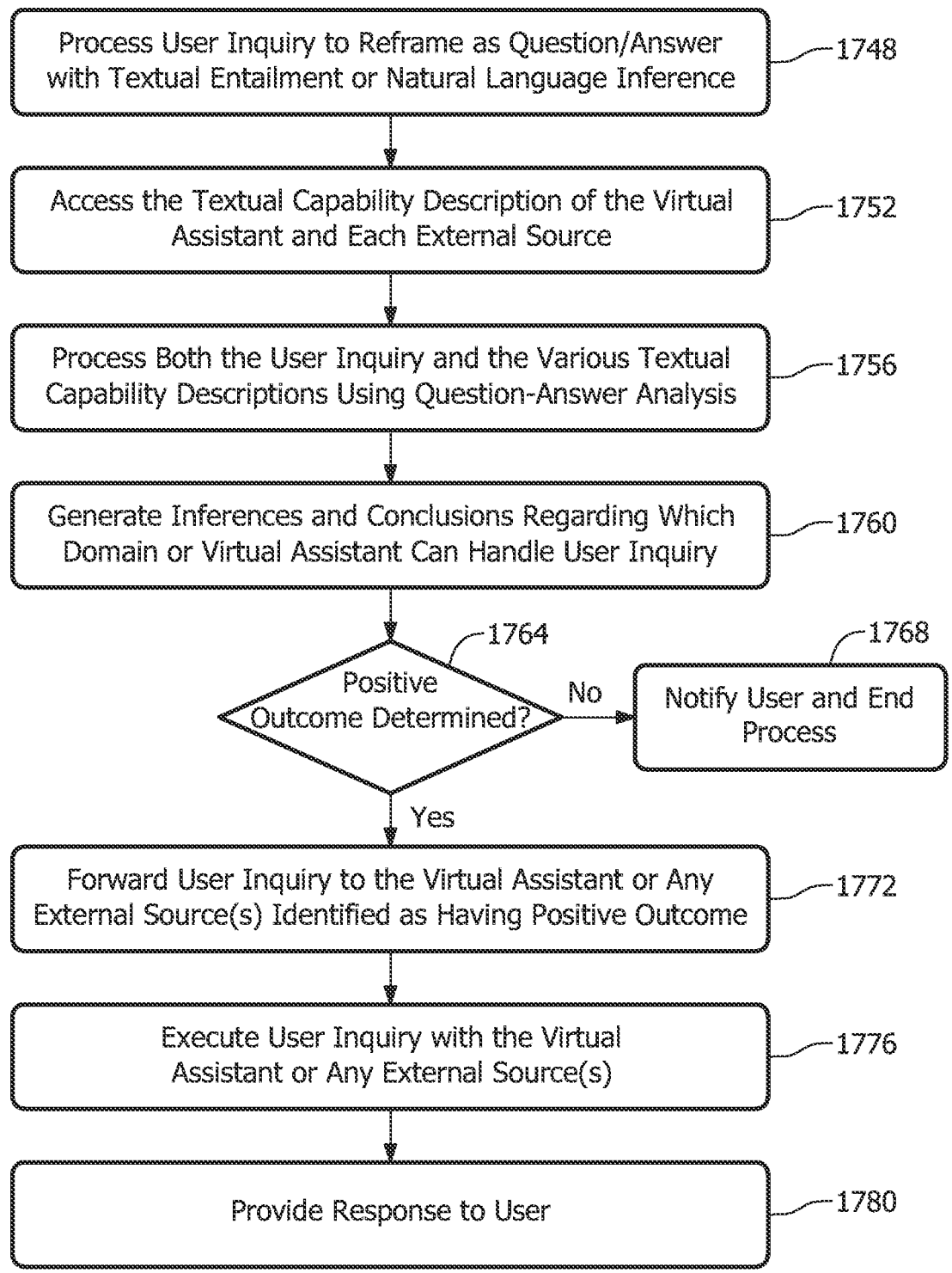
FIG. 17B illustrates the second part of an exemplary method of operation.

An exemplary method of operation is shown in FIGS. 17A and 17B. This is but one possible method of operation and other methods are contemplated. At a step 1704, the virtual assistant receives an inquiry from a user. The user inquiry may be in the form of text, voice, images, video, or any combination thereof. The virtual assistant may first assume the user inquiry is in scope and in domain. Thus, at a step 1708, the user inquiry is classified into a pre-set number of domains. Using the example in FIG. 7, a user inquiry of "harry water" may be classified into the domain of consumables (such as bottled water), media (such as movies, books, and games), and so on.

At a step 1712, confidence ratings are generated for each classified domain. At a step 1716, domains with a confidence rating over a predetermined threshold are identified as matched domains. In one embodiment, this confidence is tuned to be very high, such that false positives (wrongly classified as being in domain) are minimized at the expense of many more false negatives (for being out of domain). A user inquiry is in domain if the system can identify one or more matched domains. A user inquiry is out of domain if the system cannot understand the user inquiry or cannot identify any matched domains If the user inquiry is being classified as in domain, then the operation advances to step 1720 and the user inquiry is sent to the matching domains to be further processed, such as discussed in FIGS. 6-12B. Alternatively, if at step 1716 no domains above a predetermined threshold are identified, then the operation advances to step 1724. At a step 1724, the user inquiry is classified as being out of domain and the user inquiry is passed to an ADS. The ADS is tasked with determining if the user inquiry that is seen as low confidence at step 1716 may still be interpreted as a valid user inquiry for any virtual assistant, or if the user inquiry is truly incomprehensible.

At a step 1728, the ADS attempts to interpret the user inquiry across all supported languages as well as other factors to determine if the user inquiry can be understood in a different language or using different phrases or terms of expression. For example, as shown in FIG. 7, a user inquiry of "harry water" 708 may be processed into alternative phrases, as shown in the textual representations 716-734. Another example may be a user who typed a sentence with many grammatical and spelling errors, such as "find HP movie @3". The ADS may, using various correction and interpretation modules, interpret the input into a user inquiry to find which movie locations play the movie "Harry Potter" at 3:00 pm on that day. ADS may also include an alternate language composition module, which, processes out of domain user inquiries using alternate languages, as shown in the textual representations 712 of FIG. 7.

At a step 1732, the ADS may finish processing the user inquiry and may have identified the inquiry as either a potentially valid inquiry (such that the system may be capable of processing further), or an invalid inquiry (such that is truly incomprehensible). If the ADS identifies the inquiry as invalid, the operation advances to a step 1736 and the virtual assistant notifies the user that the inquiry is invalid and ends the process for this inquiry and may notify the user of the same. Alternatively, if at step 1728 the user inquiry is not identified as invalid, successfully interpreted into a comprehensible inquiry, such that at step 1732 the user inquiry is determined to be a potentially valid input, then the operation advances to a step 1740.

In the ADS confidence is prioritized on either end of the spectrum. That is, the confidence threshold of the determination that the user inquiry cannot be further interpreted must be very high to proceed to step 1736. In one embodiment, user inquiries interpreted with moderate confidence may either be considered as a valid inquiry if more processing time is available at steps 1740 and beyond (such as for example, user inquiries that do not require an immediate response). Thus, if the ADS is still not confident if a user inquiry is in domain or out of domain, the operation may also proceed to step 1740. Otherwise, the user inquiry may be considered invalid if lower latency in response is required.

At a step 1740, potentially valid user inquiries are processed by a TCM to identify the scope of the user inquiry, and to match the user inquiry with peripheral devices, if necessary. Textual comprehension is a more advanced method of understanding text-based inquiries implementing question answering. A question answering implementation may construct its answers by querying a structured database of knowledge or information. More commonly, question answering systems can pull answers from an unstructured collection of natural language documents. In this case, the TCM pulls answers from textual descriptions of the virtual assistant and external sources, as discussed in detail in steps 1744 to 1760 below.

Specifically, at a step 1744, the virtual assistant may identify and access all available external sources (as illustrated as item 1616 in FIG. 16 and described above). In a preferred embodiment, external sources include other virtual assistants. It is contemplated that more than one virtual assistant may operate and be available on a user's device. For example, Ski may call other virtual assistances, such as MeetKai with other capabilities, and either or both may call a third virtual assistance or access local or remote databases. In one embodiment, other internal sources (as illustrated as item 1612 in FIG. 16 and described above) may also be identified and accessed.

The virtual assistant's scope may then be combined or linked with the scope of such external sources. For example, the virtual assistant may itself, not be capable of turning on an electric vehicle. Thus, by itself, a user request to turn on an electric vehicle may be considered out of scope. However, by connecting with a second virtual assistant tailored to or in the electric vehicle, or on the user device, the ability of turning on an electric vehicle is now considered in scope.

At a step 1748, the TCM may reframes the user inquiry from being a classification task (i.e., a return task generating an in domain or out of domain classification) into a question answering and textual entailment inquiry. This may also be referred to as understanding implied meaning or natural language inference understanding of the user inquiry. Natural language inference processing is known in the art of software language processing and as such is not described in detail herein. For example, a text-based inquiry may be "find a Harry Potter movie." A question/answer inquiry of that same user request may be "can you find movies?"

At a step 1752, the scope of the virtual assistant and the external sources are defined in terms of the English language in sentence-based form. In other words, in one embodiment, the virtual assistant and the external sources' capabilities and knowledge base are described in a paragraph or more of a language. These capabilities can be automatically generated into English (or any other applicable languages) through templates based on domain and intent names or be provided through a specialized declaration framework, including being defined by those who maintain the domain. The model is then presented with the English document describing the virtual assistant, and each external source and their capabilities. In one embodiment, the scope of other internal sources (as illustrated as step 1612 in FIG. 16 and described above) may also be included in the sentence-based definitions.

At a step 1756, the TCM may use a question/answer analysis to process the user inquiry, which is now in the form of a question/answer through textual entailment or natural language inference, and the various textual descriptions of the scope of the primary virtual assistant and the external sources. Using the example above, where a user inquiry is reframed as "who can find movies?" the TCM may then analyze the textual description of the scope to determine whether the virtual assistant or the external sources may describe an ability to find a movie. An assistant may have the textual description of their capabilities including the phrase "I can search for film content", while not an exact match for "movie" the TCM could still match that they would be capable of finding a movie.

There are several differences between this process and classification. One such difference is that the question/answer system is configured such that it operates on documents of knowledge and attempts to provide human reading comprehension approximation. In this way the TCM may infer capabilities that might not be explicitly defined or determinable by the virtual assistant or an external source. The virtual assistant or any external source that is identified as a possible reading comprehension answer (such as, using the example above, any device that describes an ability to find a movie) is then passed through a feature of the TCM which is textual entailment. Textual entailment is the task of training a model to take a description that is the "premise" and an inquiry that is the "hypothesis" and determine if the hypothesis is implied by the premise, or if the hypothesis and the premise form a contradiction. For example, the premise may be an external source, such as a second virtual assistant, with the description "Assistant 1 can handle finding movies". The hypothesis may be "I can ask the Assistant 1, find me a movie". Thus, the hypothesis is implied by the premise. On the other hand, if the hypothesis is "I can ask the Assistant 1, find me a widget", then the hypothesis and the premise form a contradiction. This reframing of the task as a reading comprehension and question/answering task allows the usage of much more complicated models of human intelligence than classification.

At a step 1760, the TCM generates inferences and conclusions regarding whether the virtual assistant, or any other external sources, can handle the user inquiry or which domain can handle the inquiry. Where the hypothesis is implied by the premise, the virtual assistant or the external source providing the premise are identified as a device or application that can process the user inquiry. Where the hypothesis and the premise form a contradiction, the virtual assistant or the external source providing the premise is identified as one that cannot process the user inquiry.

At a decision step 1764, TCM determines whether a positive outcome exists. A positive outcome is the identification of the virtual assistant or an external sources, as a device or application that can handle the user inquiry. If no positive outcome exists, then the operation advances to a step 1768 and the virtual assistant notifies the user that a response cannot be located or generated, and the process ends.

If, on the other hand, one or more positive outcomes are identified, then at a step 1772, the user inquiry may be offloaded to that device or application to provide the user a result. At a step 1776, the identified virtual assistant and/or external source(s) execute the user inquiry to generate a response. Then, at a step 1780 the response is provided to the user.

For example, a user inquiry to find a Harry Potter movie may be made on a smartwatch with no movie finding capabilities. But the virtual assistant may, using TMC, identify a nearby smartphone that can find movies. The user request may thus be routed to the smartphone to complete.

What is claimed is:

1. A system for processing an out of scope or out of domain user request comprising:
   a user device comprising an input device configured to receive a user request, an output device configured to provide a response to a user, a memory, a processor, and a non-transitory machine readable storage medium storing code for execution by the processor, the code, when executed by the processor, providing:
   a first virtual assistant operating on the user device, the first virtual assistant comprising a processing engine, one or more domains, an anomaly detection system, and a textual comprehension module;
      wherein the processing engine is configured to process the user request with the one or more domains; and
      when the one or more domains cannot process the user request, generate an interpretation of the user request using the anomaly detection system, and process the interpretation using the textual comprehension module.

2. The system of claim 1 wherein the anomaly detection system further comprises an alternate language composition module, wherein the first virtual assistant uses a first language for processing, and the alternate language composition module interprets the user request using a second language which is different than the first language.

3. The system of claim 1 further comprising an external source accessible on a second user device or stored in a cloud, and the processing engine is further configured to process the interpretation using the textual comprehension module and the external source.

4. The system of claim 3 wherein the external source is a second virtual assistant having different capabilities than the first virtual assistant.

5. The system of claim 3 wherein the textual comprehension module is configured to generate a question from the interpretation, generate a text-based description of a scope of the first virtual assistant and a text-based description of a scope of the external source, and determine whether the question may be answered by the text-based descriptions of the scope of the first virtual assistant and the scope of the external source.

6. The system of claim 5 wherein the processing engine is further configured to transmit the user request to the external source for processing when the question is to be answered by the text-based description of the scope of the external source.

7. The system of claim 1 wherein the textual comprehension module comprises a textual entailment module and a natural language inference module.

8. A method for processing out of scope or out of domain user
   inquiries with a first virtual assistant comprising steps of:
   receiving a user request at a user device and converting the user request into a user inquiry;
   interpreting the user inquiry with an anomaly detection system to generate an interpretation of the user inquiry;
   forming a question from the interpretation of the user inquiry using a textual composition module;
   accessing, using a textual composition module, a dataset of text-based descriptions of a scope of the first virtual assistant and a scope of an external source;
   querying the dataset for an answer to the question; and
   when the answer is found in the description of the scope of an external source, electrically or wirelessly transmitting the user inquiry to the external source for processing by the external source to generate a response to the user inquiry.

9. The method of claim 8 wherein the external source is a second virtual assistant having different capabilities than the first virtual assistant.

10. The method of claim 9 wherein the first virtual assistant is operating on a first user device, and the external source is operating on a second device or stored in a cloud.

11. The method of claim 8 wherein the first virtual assistant uses a first language for processing, and the method further comprises processing using the anomaly detection system, the user inquiry as if the user inquiry is in a second language, differing from the first language.

12. The method of claim 8 wherein forming a question comprises using a textual entailment module.

13. The method of claim 8, the method further comprising a step of generating, using the textual composition module, the dataset of text-based descriptions of the scope of the first virtual assistant and the scope of an external source.

14. The method of claim 8 wherein the method further comprises the step of determining, using a textual entailment module, whether the question may be answered.

15. The method of claim 8 wherein the method further comprises the step of determining, using a natural language inference module, whether the question may be answered.

16. A system for processing out of scope or out of domain user inquiries with a first virtual assistant comprising:
   a first user device comprising an input device configured to receive a user inquiry, an output device configured to provide a response to a user, a memory, a processor, and a non-transitory machine readable storage medium storing code for execution by the processor, the code, when executed by the processing, providing:
   a first virtual assistant operating on the user device, the virtual assistant comprising an anomaly detection system and a textual comprehension module such that the anomaly detection system is configured to process the user inquiry to generate an interpretation of the user inquiry;
      the textual comprehension module is configured to:
         form a question from the interpretation of the user inquiry;
         access a dataset of text-based descriptions of a scope of the first virtual assistant and a scope of an external source;
         query the dataset for an answer to the question; and
         when the answer is found in the text-based description of the scope of the external source, electrically or wirelessly transmitting the user inquiry to the external source for processing to generate a response to the user inquiry.

17. The system of claim 16 wherein the external source is a second virtual assistant operating on a second device, which is different than the first user device, or stored in a cloud.

18. The system of claim 16 wherein the first user device is a smartphone.

19. The system of claim 16 wherein the first virtual assistant uses a first language for processing, and the anomaly detection system is further configured to process the user inquiry as if the user inquiry is in a second language differing from the first language.

20. The system of claim 16 wherein the textual comprehension module is configured to use textual entailment for one or more of the following: forming the question, querying the dataset, and finding the answer.

21. The system of claim 16 wherein the textual comprehension module is configured to use natural language inference for one or more of the following: forming the question, querying the dataset, and finding the answer.

* * * * *